(12) United States Patent
Trivedi et al.

(10) Patent No.: US 12,739,578 B2
(45) Date of Patent: Sep. 15, 2026

(54) OPEN EAR SYSTEM USING ARTIFICIAL INTELLIGENCE (AI) DRIVEN AUDIO SIGNAL PROCESSING

(71) Applicant: Legato Audio, Inc., Falmouth, MA (US)

(72) Inventors: Mehul Trivedi, Orinda, CA (US); Anand Parthasarathi, Cupertino, CA (US)

(73) Assignee: Legato Audio, Inc., Falmouth, MA (US)

( * ) Notice: Subject to any disclaimer, the term of this patent is extended or adjusted under 35 U.S.C. 154(b) by 0 days.

(21) Appl. No.: 19/558,855

(22) Filed: Mar. 6, 2026

(65) Prior Publication Data

US 2026/0222749 A1 Jul. 30, 2026

Related U.S. Application Data

(63) Continuation of application No. 19/174,869, filed on Apr. 9, 2025, now Pat. No. 12,627,937.

(Continued)

(51) Int. Cl.

| | |
|---|---|
| ***H04R 25/00*** | (2006.01) |
| ***G02C 11/00*** | (2006.01) |
| ***H04R 1/02*** | (2006.01) |

(52) U.S. Cl.

CPC .......... *H04R 25/507* (2013.01); *G02C 11/10* (2013.01); *H04R 1/028* (2013.01); *H04R 25/405* (2013.01);

(Continued)

(58) Field of Classification Search

CPC .... H04R 25/507; H04R 1/028; H04R 25/405; H04R 25/407; H04R 25/554;

(Continued)

(56) References Cited

U.S. PATENT DOCUMENTS

| | | | |
|---|---|---|---|
| 8,029,132 | B1 | 10/2011 | Park |
| 10,492,008 | B2 | 11/2019 | Xu et al. |

(Continued)

FOREIGN PATENT DOCUMENTS

| | | | |
|---|---|---|---|
| CN | 112001189 | A | 11/2020 |
| CN | 113348673 | A | 9/2021 |

(Continued)

OTHER PUBLICATIONS

Author unknown, "Hearing Glasses," Nuance Audio, 2025, nuanceaudio.com, https://www.nuanceaudio.com/en-us.

(Continued)

*Primary Examiner* — Angelica M Mckinney
(74) *Attorney, Agent, or Firm* — Yee & Associates, P.C.

(57) ABSTRACT

A system and associated processes include a left and right eyewear stem, each including a microphone array comprising a plurality of microphones, and a digital hearing aid that receives content from the microphone array and extracts a desired signal from the content, the digital hearing aid applying frequency-dependent gain to the desired signal to compensate for a user's hearing loss profile. The system further includes processes that receive the desired signal modified with the frequency-dependent gains to acoustically render the desired modified signal proximate to the ear of the user without anything physical being placed within an entrance to an ear canal. A rechargeable battery may be included, along with a front face of the eyewear configured to hold a pair of eyewear lenses, where the front face lacks an electrical conductor connecting the right and left eyewear stem.

22 Claims, 13 Drawing Sheets

Related U.S. Application Data

(60) Provisional application No. 63/750,331, filed on Jan. 28, 2025, provisional application No. 63/749,574, filed on Jan. 25, 2025, provisional application No. 63/749,579, filed on Jan. 25, 2025.

(52) U.S. Cl.
CPC ......... *H04R 25/407* (2013.01); *H04R 25/554* (2013.01); *H04R 25/604* (2013.01); *H04R 2225/41* (2013.01); *H04R 2225/43* (2013.01); *H04R 2430/01* (2013.01)

(58) Field of Classification Search
CPC .............. H04R 25/604; H04R 2225/41; H04R 2225/43; H04R 2430/01; H04R 3/04; G02C 11/10
See application file for complete search history.

(56) References Cited

U.S. PATENT DOCUMENTS

| | | | | |
|---|---|---|---|---|
| D874,008 | S | 1/2020 | Kotzer et al. | |
| 10,567,888 | B2 | 2/2020 | Hertzberg et al. | |
| 10,877,299 | B2 | 12/2020 | Borsoi et al. | |
| 11,765,522 | B2 | 9/2023 | Hertzberg et al. | |
| 11,852,900 | B2 | 12/2023 | Borsoi et al. | |
| 11,886,974 | B1 | 1/2024 | Casper et al. | |
| 12,081,943 | B2 | 9/2024 | Hertzberg et al. | |
| 12,549,909 | B1 * | 2/2026 | Trivedi | H04R 25/507 |
| 12,627,937 | B1 * | 5/2026 | Trivedi | H04R 25/507 |
| 2006/0007389 | A1 | 1/2006 | Fusi et al. | |
| 2006/0031066 | A1 * | 2/2006 | Hetherington | G10L 21/0208 704/226 |
| 2014/0268016 | A1 | 9/2014 | Chow et al. | |
| 2017/0164100 | A1 * | 6/2017 | Franck | H04R 3/12 |
| 2019/0052954 | A1 | 2/2019 | Rusconi Clerici Beltrami et al. | |
| 2019/0104370 | A1 | 4/2019 | Zisapel et al. | |
| 2021/0044882 | A1 * | 2/2021 | Jain | G10K 11/178 |
| 2021/0274283 | A1 * | 9/2021 | Ali | H04R 5/033 |
| 2022/0256294 | A1 | 8/2022 | Diehl et al. | |
| 2023/0153938 | A1 * | 5/2023 | Petersen | G06F 18/214 345/505 |
| 2024/0221722 | A1 | 7/2024 | Cheung et al. | |
| 2025/0016517 | A1 * | 1/2025 | Jukic | H04R 3/005 |
| 2025/0028187 | A1 | 1/2025 | Tharrett et al. | |

FOREIGN PATENT DOCUMENTS

| | | | | |
|---|---|---|---|---|
| CN | 113534500 | A | 10/2021 | |
| CN | 114080637 | A | 2/2022 | |
| CN | 217656743 | U | 10/2022 | |
| CN | 115510875 | A | 12/2022 | |
| CN | 115695620 | A | 2/2023 | |
| CN | 118711605 | A | 9/2024 | |
| WO | 2022051097 | A1 | 3/2022 | |
| WO | WO-2023087565 | A1 * | 5/2023 | H04R 3/04 |
| WO | 2024008411 | A1 | 1/2024 | |
| WO | 2024209228 | A1 | 10/2024 | |
| WO | 2024244895 | A1 | 12/2024 | |

OTHER PUBLICATIONS

Author unknown, "Pulse Frames," Pulse Audition, 2025, pulse-audition.com, https://www.pulse-audition.com/.

Bauman, "Beltone "Hear-N-See" Eyeglass Hearing Aid," Hearing Aid Museum, 2025, hearingaidmuseum.com, https://www.hearingaidmuseum.com/gallery/Transistor%20(Ear)/Eyeglass/Beltone/info/beltonehearandsee.htm.

Ex Parte Quayle Action, dated Jan. 23, 2026, regarding U.S. Appl. No. 19/174,869, 14 pages.

Notice of Allowance, dated Jan. 7, 2026, regarding U.S. Appl. No. 19/342,203, 22 pages.

Office Action, dated Oct. 24, 2025, regarding U.S. Appl. No. 19/174,869, 20 pages.

Thomas, "Hearing Aid Glasses of the 1950s," Historic Tech, Nov. 2020, historichtech.com, https://historictech.com/hearing-aid-glasses-of-the-1950s/.

* cited by examiner

600

AVERAGE SPEECH LEVELS IN OCTAVE BANDS
SPEECH LEVELS BASED ON SAMPLE OF
20 RANDOM MALE AND FEMALE TIMITS
SPECTRAL LEVELS FOR SAMPLE COCKTAIL
NOISE (OVERALL SPL SAME AS SPEECH)
dBFS
0
-5
-10
-15
-20
-25
-30
-35
-40
-45
-50
$10^2$
$10^3$
OCTAVE BAND CENTER FREQUENCIES (Hz)

800

6 OCTAVE BAND DRC LEVELS
0
-10
-20
-30
-40
-50
-60
-70
-80
-90
-100
dBFS
COMPRESSION BANDS, RATIO 4:1
EXPANSION BANDS, RATIO 8:1
BAND 1
BAND 2
BAND 3
BAND 4
BAND 5
BAND 6

1000
HASPI SCORES (CLEAN SPEECH
IN COCKTAIL NOISE @ 0 dB SNR)

UNPROCESSED
PROCESSED
HASPI v1
1
0.9
0.8
0.7
0.6
0.5
0.4
0.3
0.2
0.1
0
N0
N1
N2
N3
S1
S2
STANDARD HL

OPEN EAR SYSTEM USING ARTIFICIAL INTELLIGENCE (AI) DRIVEN AUDIO SIGNAL PROCESSING

CROSS REFERENCE TO RELATED APPLICATIONS

The present application claims priority to U.S. patent application Ser. No. 19/174,869, filed Apr. 9, 2025, titled "OPEN EAR SYSTEM USING ARTIFICIAL INTELLIGENCE (AI) DRIVEN AUDIO SIGNAL PROCESSING", U.S. Provisional Patent Application No. 63/749,579, filed Jan. 25, 2025, titled "AMBIENT AWARE AUTOMATED AMPLIFICATION LEVELING FOR COGNITIVE LEAD REDUCTION", U.S. Provisional Patent Application No. 63/749,574, filed Jan. 25, 2025, titled "SYSTEM FOR IMPROVING INTELLIGIBILITY FOR OPEN-EAR HEARING ASSISTANCE DEVICES USING HIGH FREQUENCY BASED INDIRECT PATH AMPLIFICATION," and U.S. Provisional Patent Application No. 63/750,331 filed Jan. 28, 2025, titled "MULTIBAND DYNAMIC RANGE EXPANSION FRAMEWORK." The entire disclosures of the applications listed above are hereby incorporated by reference, in their entirety, for all that they teach and for all purposes.

BACKGROUND

Conventional hearing aids require the reproduction of an audio environment alongside amplification of the desired speech content because they at least partially occlude the user's direct path access to sound. More particularly, traditional hearing assistance relies on passive occlusion that seals the ear canal and reinserts a full spectrum signal with enhanced voice-band frequencies. Low frequency content is amplified in an attempt to maintain the naturalness of speech content. Subsequently, hearing aids create a constant cognitive load for the user due to their non-perfect reproduction of their environment.

Moreover, conventional systems fail to adequately address higher order auditory object formations due to poor spectro-temporal coding and impaired selective spatial attention. Supra-threshold hearing deficits arise from an inability to discriminate speech in noise, even when some audibility is restored.

To help address these challenges, users must acclimate to their hearing aids for weeks to allow for neuroadaptation. However, compliance can be difficult, leading new users to return or not use devices. Even after neuroadaptation, hearing aids still struggle with listener intelligibility issues that hinder speech perception.

BRIEF DESCRIPTION OF THE DRAWINGS

The Detailed Description is described with reference to the accompanying figures.

DETAILED DESCRIPTION

Figure 1:
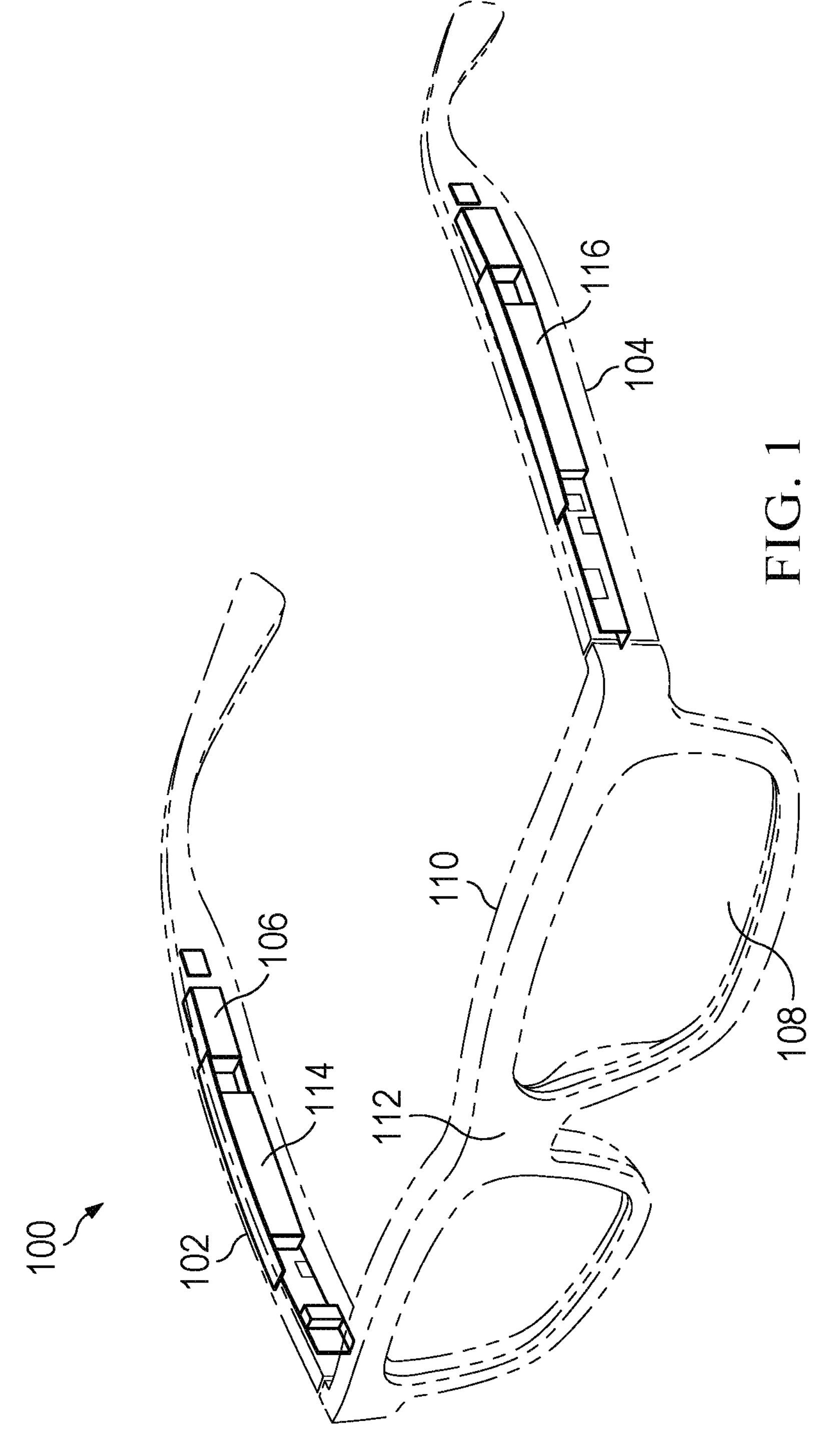
FIG. 1 is a first perspective view of an example of a pair of glasses comprising an open ear system having internal electronics packaging configured to modulate an audio signal.

The present concepts are directed to an open-ear audio system integrated into eyewear that leverages sparse artificial intelligence (AI) to augment or, in some cases, fully replace digital signal processing (DSP), along with natural, ambient sound to render audio to the ears of a user. Traditional (or dense) AI neural networks are designed to optimize for performance and often use tens or hundreds of billions of parameters. While highly powerful, these traditional dense AI networks also consume considerable memory and power. A sparse AI network may be designed to optimize hearing aid performance with an operational constraint such as power consumption. In one example, a sparse AI system is created to optimize for performance (e.g., intelligibility as measured by Hearing Aid Speech Intelligibility Index (HASPI) or the Hearing Aid Speech Quality Index (HASQI) scores or speech extraction as measured by probability that resulting signal is speech) while maintaining a power draw of 5 milliwatts (mW) or less. For example, a sparse AI network can be optimized to operate at 5 mW of power while delivering .8 HASPI score in a 0 dB SNR environment for most common hearing loss profiles. A sparse AI network can leverage sparse weights (i.e., only storing and computing on weights that are necessary to reliably extract speech from noise) and can effectively extract speech from noise (as well as other DSP functions) using 100× fewer operations and with 100× less power than a non-sparse/dense AI system. This enables a noise reduction system embedded in the frame stems of glasses with a power draw of less than or equal to 5 mW, which can support a relatively long battery life. A sparse AI processor may be achieved by removing unnecessary parameters or connections from the inference model in a neural network (e.g., by setting them to zero).

The system in one aspect uses its microphone arrays to collect a set of sound samples from a database. The system uses AI to apply one or more transformations to each sound sample, including multi-band dynamic range compression, amplification, equalization, limiting, and cancellation processes, as described herein. The processes alter the sound samples to create a modified set of sound samples. The system thus creates a first training set comprising the collected sound samples and the modified set. The system trains the model (e.g., neural or network) in a first stage using the first training set. The system of some implementations further creates a second training set for a second stage of training comprising the first training set and samples that are modified in the same or a different way, including some samples that were modified in a desired and undesired way for comparative purposes. The system conducts the stages of training of the network. In another or the same example, a model of an analog circuit is initialized in a digital computer, the model including noise samples processed according to the modules and processes described herein. The system generates values for each circuit element or other module and simulates a first digital representation of the analog circuit and/or noise based on the generated values.

In some examples, the AI is trained to denoise signals from ambient audio to isolate desired signals (e.g., speech signals) based on modeled frequencies, probabilities, detected speaker/listener movements and posturing, as well as other empirical data. Illustrative DSP and AI circuitry and software perform, among other processes, acoustic beamforming, multi-band dynamic range compression, self-voice rejection, equalization, limiting, and feedback cancellation. The sparse AI model may continuously sample and extract desired speech signals from ambient noise.

The ambient noise may include a range of audio environments. For instance, speech signals are effectively sampled both in low-noise environments (e.g., at home watching television) and high noise environments (e.g., at busy restaurants). In some cases, an ambient audio level detector may automatically make various adjustments to the system based on the level of ambient noise, such as turn on or off the AI processing, adjusting the system parameters to optimize for signal-to-noise (SNR), or adjusting the output volume of the open-ear audio system.

The left and right frame stems, or temples, of the open-ear audio system are also configured to operate as separate systems, without any electronics within or conductors through the front face of the eyewear. In some examples, the hearing assistance processing is done independently in the left and right temple stem and thus minimizes or removes a need to synchronize the left and right microphone data, as systems generate sufficiently high signal-to-noise ratio using only the microphones on the same temple. Some synchronization between the stems may be done, for example, to synchronize streaming audio (e.g., audio from a Bluetooth connection) or system controls (e.g., beamforming pattern, system volume, or left/right balance), via a wireless link between the stems.

The configuration further removes a need for conductors positioned within the front face of the eyewear. Hearing glasses using a traditional DSP approach to hearing assistance often include microphones on a front face to provide greater control for systems using traditional DSP hearing assistance techniques as it provides for improved microphone beamforming, and/or the left and right stems are connected via conductors to enable binaural beamforming between microphone arrays on each stem. Hearing glasses that use traditional DSP processing for hearing assistance also tends to be power inefficient, and thus connecting the left and right stems help these systems on battery life by avoiding wireless synchronization of audio between the stems. Unlike these concepts that place microphones or conductors in the front fact of hearing glasses, the present concepts are architected to purposely avoid any electronics or conductors in the front face to enable manufacturability of the front face, as well as ease of introducing new eyewear styles for the system.

The architecture of the present system, utilizing microphone arrays on each stem, a sparse AI processor and sparse AI model, a Bluetooth radio, a custom equalization element (e.g., for optimizing SNR and compensating for the wearer's hearing loss without causing the system to become unstable) and an open-ear audio system, enable a high performing and low-power open-ear audio system for hearing assistance in noise, without the need for conductors, microphones or other electronic elements along the front face.

Sparse AI tech enables high efficiency and reduced power (e.g., battery) requirements. Having independently operating circuitry in each stem provides a number of advantages. For example, the tooling costs for the front the frames are less costly than would be a configuration where connecting wires couple both stems together (e.g., across the bridge of the glasses). Additionally, without such connective wiring constraints, a larger number of frame styles and sizes are available to users and designers. For instance, a user can swap out the front frames for others by the detaching/reattaching a hinge or by initiating a customer service order. Examples thus provide greater front face material flexibility, along with decreased cross sections. These features further facilitate lighter weight frames, along with the front frame style flexibility.

As described herein, conventional hearing aids partially or fully occlude the ear of a user. This occlusion blocks the direct path to the eardrum and relies on the hearing aid to artificially reproduce the occluded sound via an aided path. The artificial reproduction is often marred by artifacts and over-amplification of unintended sounds. For example, impulse sounds comprising brief, sharp sounds (e.g., a drumbeat or metal clanking) are particularly prone to be over-amplified. As a consequence, an inaccurate and unnatural sounding environment is reproduced. By leaving direct audio unobstructed, its natural properties are preserved and received in their organic, true audio form. Furthermore, open ear configurations avoid needing pressure relief ports. The unobstructed audio consequently sounds familiar to the user and reduces or eliminates the need for acclamation.

The present concepts also include one or more elements to suppress a user's own voice from being amplified and played back by the open-ear audio system. Hearing one's voice through a wearable audio system is often jarring or annoying to a user, so it's important that the system avoid playing back one's voice. In some examples, one or more microphone or the microphone arrays is aimed towards the location of where a user's mouth would be when the eyewear is being worn (in addition to the microphone array having another beamforming processing capturing sound likely to include the desired signals).

The self-voice beamformer can also be fed to the AI processor to detect when voice is present, and when self-voice is present, the system can either treat that self-voice as noise and not render the self-voice or simply pause operation of the open-ear audio system while the user is speaking. In other examples, the system may include other elements for protecting against self-voice amplification, such as a skin contact microphone or a separate microphone array dedicated to self-voice detection.

In some configurations, the system can also run the user through a set-up process to capture the user's voice and train the AI models on that user's device to recognize that user's voice and treat it as noise. The voice-training of the user at set-up may be done via a companion app or comparable process. The set-up process of some examples is automated in the background. A sensor is used to detect the presence of self-voice and an algorithm calibrates the system when the user is talking.

The self-voice suppression feature is modified when a user using a networked communication device. For instance, a telephone call scenario is detected, at least a portion of the voice of the user is not suppressed. Instead, the captured and recognized voice of the user is delivered back to the phone via a wireless link. This feature allows the user to gauge their volume, among other user familiar factors that contribute to a perceived, natural phone conversation. In some examples, a sparse AI algorithm is used during phone calls to extract the wearer's voice from the noise. The system then transmits only the self-voice to the far end receiver, which cleans up the signal and improves the phone call experience.

As with any audio system that includes outward facing microphones and an amplified audio reproduction system feedback is an issue. Outward facing microphones positioned near the front of the glasses are distanced from the audio reproduction circuitry to reduce the risk of feedback. Additionally, any buttons included on the device (e.g., to control volume or change the beamforming pattern of the microphone arrays), may be positioned to minimize the risk of user's blocking the microphone arrays with their fingers, which can also cause instability. The microphones can be either omnidirectional or arranged in arrays.

To mitigate feedback, an acoustic feedback canceller is used to mitigate feedback. The feedback magnitude is typically present between a headphone and a loudspeaker. The feedback path differs from person to person, so self-voice customization is performed by the system to optimize for a specific person. Some such tailoring adjustments and calibration occur during a startup or with measurement made during operation. Feedback from the speaker is handled by an AI denoiser, with training data taken on a number of different heads in a variety of environments. In an implementation where the feedback canceller operates on the sparse AI, the feedback is managed with less power requirements than those associated with traditional systems.

Open-ear DSP algorithms of some examples supplement the AI-engine. Some such DSP operations differ from traditional hearing aid DSP processes, which are not adapted to open-ear configurations. As described herein, an implementation is trained to extract desired signals from ambient audio based on modeled frequencies, probabilities, and empirical data. As such, while the AI-engine extracts the desired signal, DSP approaches may either be integrated within the sparse AI model, thus reducing or eliminating the need for separate DSP processing. Or the DSP processes may be processed outside of the sparse AI model via separate DSP processing.

An implementation of the system renders the desired signal loudly enough for the user to hear in a noisy environment. More particularly, the rendered audio signal comprises a sufficiently high sound pressure level (SPL) as to not be drowned out by background environmental noise. Speech reproduction occurs in an illustrative frequency range of 300 Hz to 3,000 Hz. This feature reduces the requirements of the speaker design. In a traditional DSP design, the system has to be able to handle the unintended signals that get amplified like dish clatter and sharp sounds. Thus, the traditional system needs to be able to handle more output than would be needed than if it was only intended for amplifying speech. In contrast, using the sparse AI and extracting/amplifying only speech, examples use a lower-performing or more efficient speaker and amplifier design. Other systems with traditional DSP would otherwise have to clip or saturate the digital signals or speaker.

The efficient use of a driver's output allows use of a low-profile oval or rectangular-shaped driver, which fits discreetly into the stems of the glasses, coupled with an amplifier. Other drivers, particularly larger drivers or higher-powered amplifiers may be used in other implementations to extend the frequency range of the open-ear audio system, but often at the cost of size and power.

According to another aspect, an implementation of the open-ear audio system delivers audio in the near field (e.g., proximate the ear) while rejecting some or all audio in the far field (e.g., distant from the ear). This delivery feature enables audio to be delivered in focused, isolated manner to the user. Put another way, the audio is heard by the user and not by others.

The audio system determines the noise level of the listening environment and automatically adjusts the output of the open-ear audio system to preserve a specific, preprogrammed SNR (e.g., 10 dB SNR) or the user's desired SNR level with the noise level of the environment. As such, the system delivers high audio output/SPL in a noisy environment (e.g., 80 dB average SPL) and low audio output/SPL in a quiet environment (e.g., 50 dB average SPL). This eliminates the need for the user to constantly adjust volume up or down based on the noise level. In some examples, the AI algorithm accounts for wind noise detection and mitigation, howling, and single tone feedback.

In this manner, examples reduce or obviate the need to reproduce an audio environment alongside amplification of a desired speech content because the user's direct path access to sound is unoccluded. As such, the naturalness of speech content is maintained without having to reproduce low frequency ambient noise. Examples thus reduce the cognitive load for the user due. Through selective spatial attention and speech discrimination, implementations address higher order auditory object formations and suprathreshold hearing deficits that complicate conventional system operation. Moreover, the open ear configurations of some examples allow fast neuroadaptation for users with less listener intelligibility issues.

Turning more particularly to the drawings, FIG. 1 is a perspective view of an example of a pair of glasses 100 comprising an open ear hearing assistance system having internal or external circuitry 114, 116. The left and right frames stems, or temples, 102, 104 include left and right signal chains and associated circuits configured to modulate an audio signal. The independently powered and operated left and right subsystems (e.g., left and right frame temples 102, 104) capture, process, and render audio. Because the left and right frame temples 102, 104 are independent, there are no conductors or electronic components located along the front face 110 of the glasses that couple the hearing assist circuitry in the temples 102, 104. In some implementations, the hearing assistance functionality in the left and right temples (or stems) operate independently, and a wireless connection between the two temples (e.g., a Bluetooth wireless connection) provides synchronization when needed, such as changing system functions like system volume, left/right balance, and beam-forming patterns and when playing back audio received from a connected audio source like playback of music from a connected smartphone or far-end voice during a phone conversation via a connected smartphone.

The open ear configuration of the pair of glasses 100 enables speakers for the rendering of an amplified desired signal to be located close to the user's ear (near a portion 106 of the glasses 100) while allowing ambient sound to reach the ear in an unobstructed manner. Moreover, the microphone arrays (comprising two or more microphones) are arranged for capturing sounds of the surrounding environment are selectively positioned along a frame of the glasses 100. For instance, positioning microphone arrays towards the front of the glasses 100 (e.g., proximate to the front face of the glasses 100) enables the microphone arrays to be directed towards where the user is facing in a narrow beam configuration (e.g. 10 degrees normal to the front face of the glasses), a wide beam configuration (e.g., 90 degrees or 180 degrees normal to the front face of the glasses), or an omnidirectional configuration (i.e., 360 degrees around the head).

Other or the same microphones and speakers may be used to receive input from the user (e.g., voice commands) and convey audible system prompts to the user. The circuitry 114, 116 may additionally include one or more buttons, switches, or other touch responsive controls for user interaction, such as volume control or changing the microphone beamforming pattern (e.g., narrow/10 degrees, 90 degrees, 180 degrees, 360 degrees normal to the front face 110). The buttons are preferably located in a position that reduces the risk of the user covering or blocking a microphone or speaker, which could otherwise cause feedback or system instability.

Figure 2:
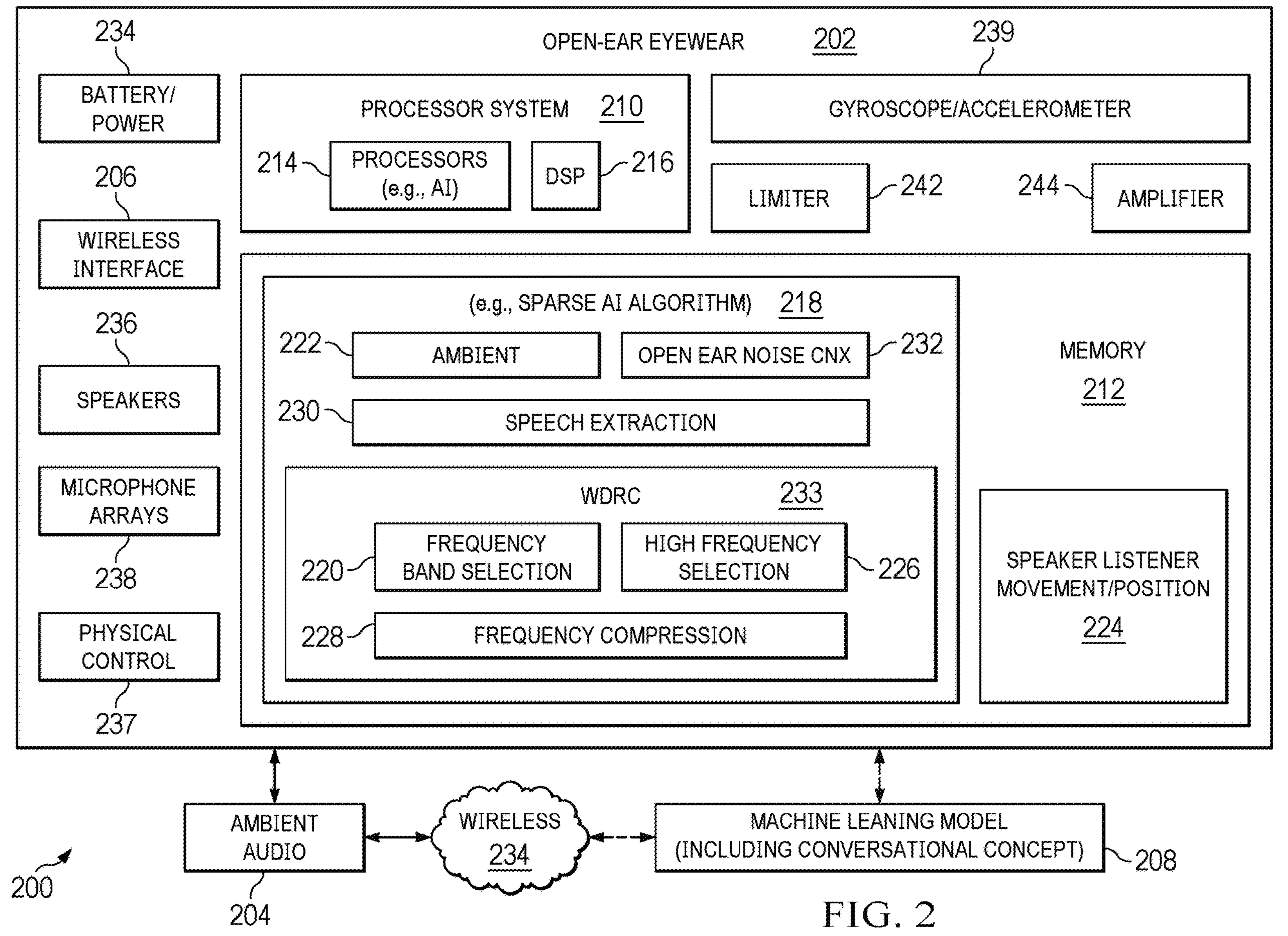
FIG. 2 is a block diagram of an example of an open-ear, AI-assisted audio processing system that is trained to extract desired signals from ambient audio based on modeled frequencies, probabilities, and empirical data.

FIG. 2 is a block diagram of an implementation of an open-ear audio system 200 capable of rendering audio processed by AI trained algorithms according to sampling selective frequency bands to identify, isolate speech data and improve/optimize intelligibility. In some specific examples, the frequency bands are selected based on a probability of their including the desired speech and processed to optimize intelligibility of that speech for the ambient listening environment. Other illustrative processing techniques include one or more of: acoustic beamforming, multi-band dynamic range compression, self-voice rejection, equalization, limiting, wide dynamic range compression/expansion (WDRC), and feedback cancellation, among others described herein. The identified speech is amplified and otherwise processed prior to being rendered proximate the ear of the wearer of the system 200.

FIG. 2 more particularly shows examples of hardware components present, for instance, in each illustrative temple 102 and 104 of FIG. 1. Included in each temple is a microphone array 238 coupled to or otherwise in communication with a processor system 210. The processor system 210 may include one more processors, distributed throughout or remotely located to the open eyewear 202. Inherent to the open eyewear configuration, the microphone array 238 receives and processes ambient audio 204 in a manner in which the ear of the wearer is not obstructed.

Examples of the processor system 210 include a sparse AI processor 214 and a digital signal processor 216. The processor system 210 executes an operating system for the hearing glasses controls, among other modules, a wireless interface (e.g., a Bluetooth radio connection) capable of communicating with a wireless network 234. The output of the processor system 210 is connected to a limiter 242 and an amplifier 244, which is in turn connected to one or more speakers 236.

A physical control element 237 (e.g., a button, rocker switch, or tap control) and a gyroscope/accelerometer module 239 are also included and coupled to the processor system 210. In some implementations, the physical control element 237 and/or gyroscope/accelerometer 239 are included in only one of the two frame stems, or templates. In implementations where the physical control element 237 is located on both stems, each physical control element 237 may control different functions (e.g., the right physical control element may be a rocker switch and control volume, and the left physical control element may be a button to select the microphone beamforming pattern).

A memory 212 accessible to the processing system 210 stores the sparse AI inference model 218 that includes one more of: a speech extraction module 230 and a wide dynamic range compression/expansion (WDRC) module 233 (which includes a frequency band selection 220, high frequency expansion selection 226, frequency compression selection 228). The memory 212 also includes modules that are outside the AI inference model 218, such as an ambient sound module for determining the loudness of the ambient environment, and a speaker listener movement/position module 224 for determining when a user is trying to listen to another person talking.

In some implementations, the AI inference model 218 (e.g., a sparse AI algorithm) includes an open ear active noise cancellation module 232 that predicts the noise in a certain frequency range that will arrive at the wearer's ear. The open ear active noise cancellation module 232 further generates an anti-noise signal to cancel the noise energy at or near the wearer's ear. The open ear active noise cancellation module 232 may use the microphone arrays 238 and apply a frequency filter and transfer function to predict the noise in a certain frequency range that will arrive at the ear. Alternatively, the system 200 may include an additional microphone closer to the user's ear (e.g., proximate to speakers 236) to detect noise closer to the ear. A frequency filter and transfer function may also be used to improve performance. An open ear active noise cancellation system may sample the noise signal at a significantly higher rate than what is necessary for extracting speech from noise in the AI speech extraction block 230, as noise patterns change more rapidly than speech. To conserve power the ambient noise module 222 may automatically turn an active noise reduction system on in high noise environments and off in non-high noise environments to conserve battery power.

The various circuitry and software shown in the illustrative system 200 maintain aspects of the naturalness of speech content while improving other speech processing outputs. Through selective spatial attention and speech discrimination, for example, implementations improve speech intelligibility and the overall listening experience of a wearer.

Figure 3A:
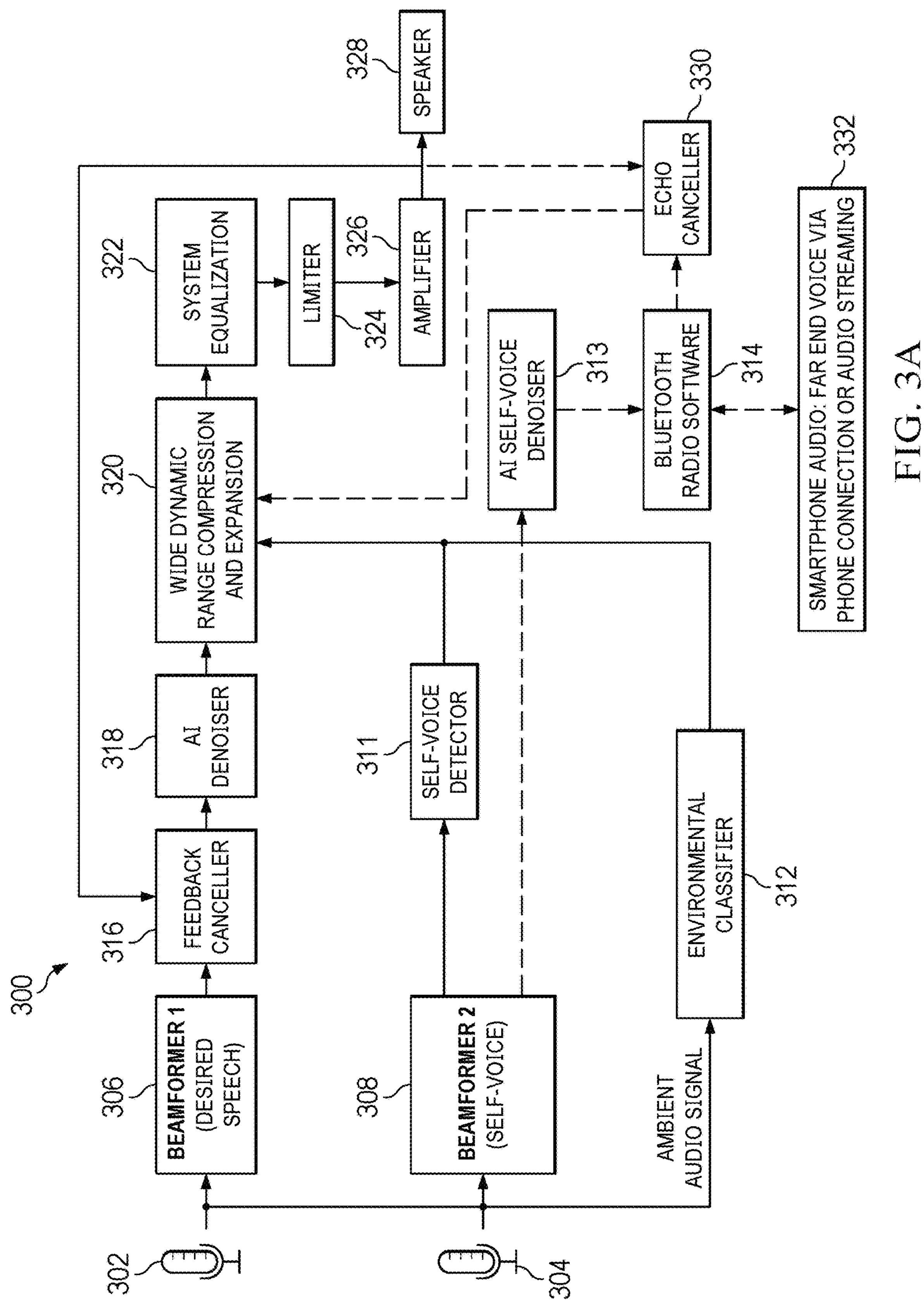
FIG. 3A-3B are a block diagrams of another example of an open-ear, AI-assisted audio processing system.

FIG. 3A is a block diagram of an example of an open-ear, AI-assisted audio processing system 300 embedded into the stem of a pair of hearing glasses that is trained to extract desired signals from ambient audio based on modeled frequencies, probabilities, and empirical data. In some implementations, the system 300 comprises a left or right-side audio circuit path. As such, the system 300 of some examples is housed in or on a right or left stem of a pair of glasses, such as the eyewear 100 of FIG. 1. An identical or similar system to 300 may be embedded in the other stem of the hearing glasses to provide hearing assistance to both ears. The system 300 may include some or all of the functional elements (e.g. modules) illustrated in the eyewear system 100 of FIG. 1.

FIG. 3A more particularly illustrates a system 300 having an array, or plurality of microphones that may be positioned in a line. The illustrated examples shows two microphones, 302, 304, but other systems may include additional microphones. The array of two or more microphones 302, 304 enable the system 300 to steer the area where the microphones 302, 304 pick up desired speech audio. Examples of the steering include multiple patterns, such as a focused steering. Focused steering includes a narrow beam in front of the users. For instance, the beam angle may include about a ten-degree spread incident to the front face of the glasses (e.g., face 110 in FIG. 1).

In another example of steering, the reception of the microphones 302, 304 is steered to include a ninety degree, square-like pattern that extends directly to the left of the wearer of the system 300. This orientation is called ninety degree left steering. A ninety degrees right steering orientation incudes a square-like pattern that extends directly to the right of the wearer. Another two steering examples include patterns that are 180 and 360 degrees (e.g., omni-directional) normal to the front face of the glasses.

In addition, the microphones 302, 304 are also steered to the mouth of the wearer to pick up the self-voice signal. The self-voice signal is used to both reject the self-voice signal and to transmit the self-voice to telephone or other networked communication device via a wireless connection, such as Bluetooth.

A first (or primary) beamformer module 306 of the example of FIG. 3A receives speech signals from the microphones 302, 304 that correspond to where desired speech is present. The first beamformer module 306 is used to implement the steering pattern in the microphones 302, 304. The steering pattern is selectable by user in some implementations using software control on a companion app or may be selectable by using a physical control input device, such as a button or rocker switch on the glasses, or by using voice control or a handheld remote control. The first beamformer module 306 may be implemented in DSP or AI.

A second beamformer module 308 of the example of FIG. 3A receives speech signals from the microphones 302, 304 that correspond to self-voice of the user. The second beamformer module 308 controls the steering pattern of the microphones 302, 304 in such a manner as to pick up the user's own speech. An output from the second beamformer module 308 is transmitted to a self-voice detector 311 and a self-voice denoiser 313, which is a part of a telephony signal path. The second beamformer module 308 may be implemented in DSP or in AI. Other implementations use bone conduction, an accelerometer, or another sensor in contact with the head to detect voice.

In addition to providing ambient audio to the first and second beamformer modules 306, 308, the microphones 302, 304 provide the ambient audio to the environmental classifier module 312. The environmental classifier module 312 detects the listening environment and classifies various characteristics of the environment to adapt the system to optimize performance, which may be energy efficient performance (especially in low noise settings) or hearing assistance performance (especially in high noise settings). Examples of environmental characteristics the classifier module 312 may detect are the level of ambient noise, amount of reverberation and speech included in a noisy environment (e.g., like present in a cafeteria), and steady state noises (e.g., such as are produced by an HVAC system or wind). Dynamic range compression/expansion processes automatically react to the specifics of the environment to maintain a constant signal-to-noise ratio of the desired speech per frequency band.

The environmental characteristics are used to automatically modify or select algorithms. For example, an implementation of the AI denoiser in a loud, reverberant restaurant scenario is used to minimize amplifying undesired artifacts at the cost of power and making speech more robotic, but easier to understand. Continuing with the example, the system automatically backs off the extent to which the AI denoiser is used when the person leaves the restaurant. As such, the wearer does not need to change the system volume themselves via an app or buttons. In some implementations, the system 300 operates to maintain a desired SNR of 10 dB SNR in all ambient environments, until the noise level in the ambient environment exceeds the output capacity of the audio system to maintain 10 dB of SNR. In this high-noise situation, the system may attempt to deliver as much SNR as possible while keeping the system stable.

In another or the same example, characteristics are used to automatically change the directionality of the microphone beamformers 306, 308. For example, in a low noise environment where a user wants to be aware of their surroundings (e.g., in a quiet park or office space), the system 300 may detect and classify to switch to 360-degree omni mode. Should the wearer later walk into a noisier environment, the system 300 switches to a focus mode to avoid amplifying more sounds and cognitively overwhelming the user. As such, the directionality of beamformers are automatically controlled based on ambient environment characteristics.

The signal from the first beamformer module 306 is processed in a feedback canceller block 316 and an AI denoiser module 318, both of which are implemented in a sparse AI processor in this example. The output of the AI denoiser 318 is processed by a dynamic range compression and expansion module 320. The dynamic range compression/expansion module 320 also receives input from the self-voice detector 311 and environmental classifier block 312.

The feedback canceller module 316 is trained to recognize oscillations present in the signal going to the speaker that are not present in the signal from the beamformer and then reducing/clamping gain on the audio output to minimize audible feedback. Thus, the feedback canceller module 316 suppresses or eliminates unwanted audio feedback using audio signal inputs from the beamformer 306 and the signal being sent to the speaker 328. The limiter 324 prevents a received audio signal from exceeding a set level to avoid distortion and clipping.

After the signal from the primary beamformer 306 is denoised by the AI denoiser 318 it is processed by the dynamic range compression/expansion module 320. An example of the dynamic range compression/expansion module 320 does two processing steps: it applies frequency dependent gains to compensate for a user's hearing loss (if any), and it compresses and expands portions of the signal to improve intelligibility.

More particularly, the dynamic range compression/expansion module 320 applies frequency dependent gains to the denoised signal to compensate for a user's hearing loss. The gains applied may be specified by a hearing loss prescription specified by National Acoustics Labs NAL-NL2 for the user.

In some examples, the system 300 may apply (e.g., in a dynamic range compression/expansion module 320) frequency-dependent gains according to the following hearing loss profiles:

(a) Normal hearing (no hearing loss);

(b) One of n (e.g., 3 or 4) "preset" settings (selectable by the user) that adequately address a large number common hearing loss profiles; or (c) A specific set of parameters programmed into the system by a hearing care professional (e.g., an audiologist) or determined by a self-fitting software strategy that match a specific hearing loss profile of the wearer (e.g., as determined by an audiogram or pseudo-audiogram)

The dynamic range compression/expansion block 320 may use frequency-dependent gains specified by commonly used hearing aid prescription setting such as the NAL-NL2 settings provided by the National Acoustic Laboratories or the Desired Sensation Level (DSL) v. 5.0 by the National Centre for Audiology, Western University. For the preset settings, the system may utilize the preset settings described by Urbanski, D., Hernandez, H., Oleson, J., & Wu, Y. (2021). Toward a New Evidence-Based Fitting Paradigm for Over-the-Counter Hearing Aids. *American Journal of Audiology,* 30 (1), 43-66., which adequately cover a large range of hearing loss profiles.

As noted above, the dynamic range compression/expansion module 320 may also compress or expand the signal to improve intelligibility. For example, the module 320 may compress a loud signal (e.g., between 0 and −40 dBFS) in lower frequencies (e.g., octaves centered at 125 Hz, 250 Hz, and 500 Hz) and expands the signal where speech is most likely present in middle and higher frequencies (e.g., octaves centered at 1000 Hz, 2000 Hz, and 4000 Hz). The dynamic range compression/expansion module 320 may determine where speech is most likely present based on probabilities assigned by the AI processor as part of the denoising processing 318. The module 320 may also receive input from an environmental classifier 312 and modify its signal compression and expansion based on the sound environment. For example, if the environmental classifier 312 detects a loud environment (e.g., 80 dB+), it may trigger the dynamic range compression/expansion module 320 to modify its parameters to account for the Lombard effect, which is the tendency for speech to increase in both volume (amplitude) and frequency in loud environments.

The dynamic range compression/expansion module 320 also processes the user's self-voice signal in the telephony signal path (shown in dotted lines). So, during a phone call, the user's self-voice is not suppressed but rather is processed and fed into the dynamic range compression/expansion module 320 before being sent to the audio system for equalization and output.

Turning back to the output of the second beamformer 308, which is directed to detecting the user's self-voice. The output of the second beamformer 308 is processed by a self-voice detector 311, which determines if the user is speaking. In some examples, it may detect based on the signal strength in a portion of the voice band (e.g., 200-400 Hz) of the beamformer or it may process the second beamformer signal using an AI denoiser to determine the probability that voice is present. If the self-voice detector 311 determines that self-voice is present, it triggers the dynamic range compression/expansion module to reduce or eliminate gain applied to the primary processing path so that the user's self-voice is not amplified and sent to the audio system. Once the user's self-voice is no longer present, the self-voice detector 311 signal the dynamic range compression/expansion block to resume operation in the primary processing path. In other implementations, the primary beamformer 306 or the audio system (322-326) is disabled when the user is speaking. In yet other examples, the system may be trained on the user's self-voice (e.g., at set up via a companion app) thus allowing the denoiser to recognize the user's self-voice and treat it like noise.

The system 300 also includes a radio, for example a Bluetooth radio 314, that can receive streaming audio (e.g., music or audio from video) as receive phone calls. Incoming audio from a connected device 332 (e.g., a smartphone) is received by the radio 314 and processed by an echo canceller 330. An echo canceller module 330 may operate in a manner similar to the feedback canceller module 316 to detect and prevent oscillation between the speaker 328 and the microphones 302, 304.

When streaming audio is present via the Bluetooth link 314 (e.g., either streaming audio or telephone audio), the system 300 may disable the primary processing path by, for example, disabling input from the primary beamformer. In other implementations, disablement of the primary processing path is done only in the case of phone calls or only in the case of streaming audio.

In an implementation, the system 300 enables a full duplex conversation between the far end talker and near end talker (i.e., the user). This means that the user can both hear the far end voice through speaker 328, and use the system's microphones 302, 304 to send the user's voice to the far end. In the case of a phone call, the output of the second beamformer 308 is sent to a self-voice denoiser 313, which may be similar (or identical) to the AI denoiser 318 in the primary path. The self-voice denoiser reduces noise present in the second beamforming signal, thus creating a cleaner speech signal to send to the far end listener via the Bluetooth connection with the user's smartphone 332.

The incoming Bluetooth audio signal is fed into the echo canceller 330 and then into the dynamic range compression/expansion block 320 for processing before being delivered to the audio system for output. In the case of phone calls, the dynamic range compression and expansion of the incoming voice signal may still be applied by module 320 to improve intelligibility. In the case of streaming audio, the dynamic range compression and expansion of the audio may be disabled (but the frequency-dependent gains to compensate for hearing loss would typically still be applied).

Turning back to FIG. 3A, the output of the signal from the dynamic range compression/expansion module 320 is sent to the audio system, beginning with a custom equalizer 322 and applies an equalization scheme to adjust the output of the speaker to optimize the quality of the audio that is received at the user's ear drum. This may be a fixed equalization scheme for all users or may be customized for a particular user via a calibration procedure at set up. For example, a user could take a picture or video while wearing the device and software could determine the distance from the speaker output to the entrance of the user's ear canal to customize the equalization.

After the custom equalization is applied in 322, the signal is fed to a limiter 324, amplified by an amplifier 326, and delivered to a speaker 328.

The denoiser module 318 (as well as 313) of an implementation includes an AI interference model that has been trained. The AI model operates in the frequency domain and extracts a desired signal with probabilities assigned, as described herein.

The probability assignment of some examples is further used for determining the thresholds for the dynamic range compression/expansion. The compression and expansion thresholds may be fixed during design and based on assumed speech levels. However, since speech levels and spectrum change with speech effort, the thresholds can be different. The thresholds are shifted if the model is trained ahead to obtain the best estimates.

As described herein, processes selectively expand the gain applied to certain frequency bands of an audio signal based on an AI determined probability that the band is a clean signal to improve or maximize intelligibility. Frames of sampled speech in the time domain are transformed into frequency domain. Frequency bins are then aggregated into frequency bands. The AI model is trained with speech corpus containing several talkers and speech efforts. The root mean square value of the signal level generated within each frequency band is used to generate a probability of likely occurrence of the levels within each frequency band for different speech effort. The threshold values for the dynamic range compression/expansion are then set based on this most likely estimate. This allows the threshold values to change when in use in different environments. Threshold values are set in terms of signal expansion to avoid inadvertently amplifying noise instead of speech.

Figure 3B:
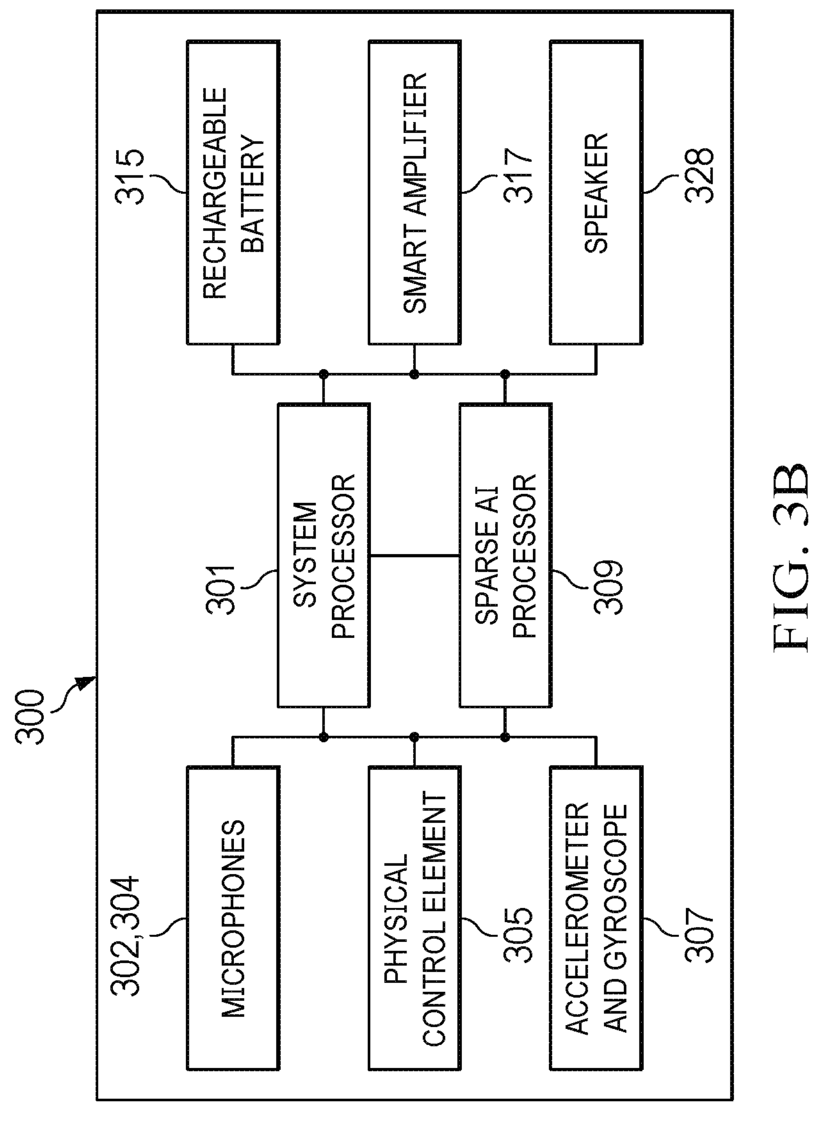

FIG. 3B is a block diagram of the primary hardware components of the system 300 which may be embedded in the stem of a pair of hearing glasses such as those shown in FIG. 1. In this example, the system includes a system processor 301 (that may include the system operation system, a DSP processor, and a Bluetooth radio), a sparse AI processor 309, a microphone array 302, 304, a physical control element 305, an accelerometer/gyroscope element 307, a rechargeable battery 315, a speaker 328, and a smart amplifier, which can process the system equalization, limiter, and amplification of the signal that's delivered to the speaker 328.

The AI-based hearing assistance functionality in system 300 generally operates independently in each stem (or temple arm) in a pair of smart eyewear, such as those shown in FIG. 1. This helps to eliminate the need for conductors or electrical components along the front face of the glasses. Synchronization that does need to happen between the left and right stems of the glasses (e.g., synchronizing audio playback from streaming audio via the Bluetooth connection or synchronizing meta controls such as volume or beamforming pattern selection) can be done via the Bluetooth radio in each stem. The system 300 has been architected to avoid the need for conductors or electrical components along the front face of the glasses.

Figure 4:
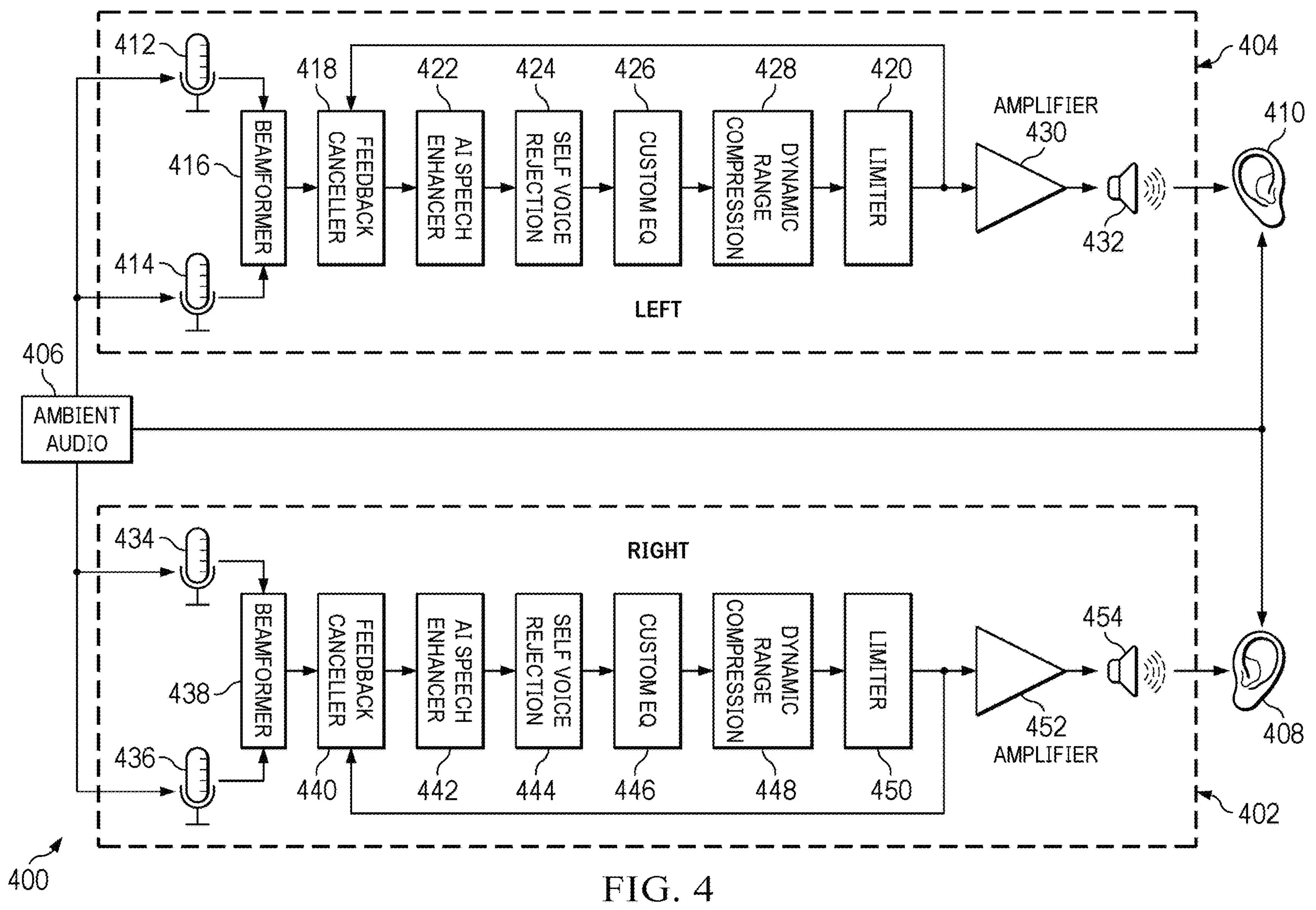
FIG. 4 is a block diagram of an open-ear audio system that includes right and left audio circuits paths.

FIG. 4 is a block diagram of another open-ear audio hearing assistance eyewear system 400 that includes right and left audio circuits paths 402, 404 that are independently housed in the right and left stems of glasses frames. The right and left audio circuits paths 402, 404 receive and process ambient audio 406 prior to rendering it to a user's ears 408, 410, respectively.

More particularly, the left audio circuit path 402 includes first and second microphones 412, 414 forming a microphone array to receive the ambient audio 406. The sparse AI inference model that is loaded into the AI processor is trained to extract the signal from the microphone arrays 412, 414 and 434, 436 that correspond to the desired listening pattern (e.g., narrow focus, 90 degrees left, 90 degrees right, 180 degrees or 360 degrees normal to the front face of the glasses). The microphones arrays are effectively steered by the AI or otherwise directionally focused to one or more areas area where the desired speech is present (this is the primary beamforming area).

In one example, output signals from one or both of the microphone arrays (e.g., 412, 414 and/or 434, 436) are processed by a beamformer 416 (and/or 438) to create a secondary beamforming area focused on sound in an area at or near where the user's mouth would be located when the system 400 is worn.

The primary beamforming area can be selectively changed by the user via a button control or companion app control to various configurations including a front-facing narrow pattern (e.g., 10 degrees normal to the front face of the eyewear), 180 degrees normal to the front face of the eyewear, and 360 degrees around the eyewear). In other examples, the primary beamforming area can be automatically changed by the operating system of the system 400 based on the ambient noise environment, geographical location of the user (provided via a connected smartphone), or a head gesture detected by a gyroscope or accelerometer in the system 400 indicating the user is straining to hear. The object of the primary beamforming pattern is to direct the microphone array 412, 414 (and/or 434, 436) to where the desired speech is originating (e.g., immediately in front of the user, around the front of the user, or all around the user). The beamformer 416 (and/or 438) thus enhances the signal strength of desired signal while reducing unwanted noise, reverberation, and interference.

The secondary beamforming area is focused on where the mouth of the user would be located when the user is wearing the system 400. The secondary beamformer may be implemented in the AI processor, or it may be implemented using a DSP processor. The object of the secondary beamforming area is to detect when the user is speaking and prevent or reduce amplification and playback of the user's own voice via the audio system (e.g., 420, 430, 432 and 450, 452, 454). In one example, the operating system of the system 400 mutes the amplifier system 430, 452 when a strong voice signal is detected in the secondary beamforming area. A strong voice signal may also be detected by processing the sound from the secondary beamforming area via the AI speech enhancer, which functions to extracts speech from noise. The system may infer the user is speaking when strong speech signal (e.g., exceeding a predetermined energy level in a predetermined frequency range, such as 200-400 Hz) is extracted from the secondary beamforming area, and trigger a self-voice rejection process (e.g., muting the audio system). As described herein, a sidetone version of the captured voice is unsuppressed during some examples of telephone calls and other networked communication events.

A feedback canceller 418, 440 suppresses or eliminates unwanted audio feedback by receiving feedback from the limiter 420, 450 to detect when the system is going unstable using a variety of well-known feedback detection techniques. If the feedback canceller 418, 440 detects the system is going unstable, it mutes or reduces the signal level of the beamformer 416, 438 into the processing chain.

The signal from the feedback canceller 418, 440 is received by a sparse AI speech enhancer module 422, 442. The sparse AI speech enhancer module 422, 442 processes the audio received in the primary beamforming area from the beamformer 416 with an AI trained to extract speech data contained within noise based on probabilities of being located within selectable frequency bands.

Once the desired speech signal is extracted by the sparse AI speech enhancer 422, 442, a custom equalization 426, 446 is applied to the desired signal to optimize the audio quality at the expected location of the wearer's ear.

The output of the custom equalization block is fed to a dynamic range compression/expansion block 428, 442, which applies frequency-dependent gains (positive or negative) to compensate for various hearing loss profiles, as well as compressing or expanding the denoised signal to improve intelligibility in noise. In one example, the dynamic range compression/expansion block 428, 448 applies different frequency-dependent gains according to various hearing loss profiles, which can either be selected by the user using a companion app to choose between several presets that is preferred by the user.

In other examples, the dynamic range compression/expansion block 428, 448 may be programmed into the system 400 by a hearing care professional (e.g., an audiologist) based on the user's hearing test (e.g., an audiogram). The hearing care professional programming may be delivered to dynamic range compression/expansion block 428 in the system via a companion app to enable remote programming by the hearing care professional. In another example, the custom equalization is automatically determined by a self-fitting companion app based on a hearing test of the user (e.g., an audiogram or a pseudo-audiogram). In another example, the custom equalization is not set to compensate for hearing loss but is adjusted by the user via known equalization adjustments (e.g., bass, treble, left/right balance).

An output from dynamic range compression/expansion block 428, 448 sent to a limiter 420, 450 that prevents a received audio signal from exceeding a set level to avoid distortion and clipping of the speaker 432, 452. The output of the limiter is sent to an amplifier 430, 452 and speaker 432, 454 located proximate to the user's ear 410.

The right audio circuit path 402 includes similar hardware and algorithms and operates independently from the left path 404 to provide hearing assistance. Audio streaming and system controls (such as volume, left/right balance and beamforming patterns) are synchronized via wireless connection, such as Bluetooth connection. Because the left and right sides operate largely independently to deliver hearing assistance, no conductors to electrical components are needed across the front face of the eyewear that system 400 is integrated.

As stated above, implementations use an open ear acoustic system to reduce cognitive load by allowing the user to hear the environment in its natural form via a direct path that does not fully or partially occlude the ear. As shown in the examples illustrated in FIGS. 2, 3A and 3B, may include an ambient noise level sensor 222, environmental classifier 312, and/or a gyroscope/accelerometer 239, 307. One or more sensors may detect an average or instantaneous noise level in the environment and/or whether a wearer of an open ear system is speaking. The sensors of the same or another implementation may also detect any head and body movements indicative that the wearer is trying to listen to a person around them. In other implementations, other sensors may be substituted or added to the sensors described in FIGS. 2-3, such as a camera, a gyroscope, a motion sensor, a proximity sensor, a pressure sensor, a plurality of microphones, an electromagnetic antenna, and a location sensor, among others.

The monitoring of the ambient noise, wearer behavior and the behavior of people or desired audio sources around the wearer minimizes both the power consumption of the device, as well as unnecessary stimulus and the cognitive load to the user. Ambient aware processing provides automatic volume control, adjusting the wide dynamic range compression/expansion parameters for any anticipated Lombard effect, as well as adjusting the beamformers to narrow the beams when the processor determines (e.g., using the gyroscope) that the user is struggling to hear.

For example, when the system detects that the wearer is in a relatively quiet environment (e.g., is not speaking and there is no indication that there is a desired speech or other audio signal to be heard), the system may not output any audio to the augmented path. Similarly, when the system detects that the wearer is in a noisy environment, like a loud restaurant, and detects (e.g., via a gyroscope) that the wearer has tilted her head indicating she's trying to listen, the system may output an amplified desired speech signal via the augmented path. The amplification level may be frequency dependent and depend on the level of the incoming desired speech signal as well as the hearing loss profile of the wearer. In one example, the average target SNR is 10 dB. An SNR of 10 dB is advantageous because intelligibility improvements starts to level off beyond that. The is level may be an average because the realized SNR will vary as a function of frequency and the amplification levels.

The open-ear configuration of the hearing glasses described herein inherently include both direct and indirect (or augmented) audio paths. The direct path is left unchanged and provides low frequency natural content while the indirect path selectively amplifies only higher band content to improve intelligibility for a given hearing loss profile. The user is spared distractions conventionally attributable to distortion and the imperfect removal of ambient environment elements. Instead, users hear ambient noise naturally via an indirect audio path with little or no neuro-adaptation, which would otherwise take weeks or months to fully acclimate in a hearing aid that fully or partially occludes the ear.

By keeping the direct path open, naturalness and some spatial cues are preserved. Directional microphones and noise reduction in the augmentation path provide additional spatial localization cues and speech separation from noise. This feature facilitates the potential to change the spectro-temporal structures dynamically via the dynamic range compression/expansion processing. Potential changes include frequency-dependent gain adjustments, as well as enhanced object formation for selective attention and enhancements to speech conversation in noise. A neural network is trained with appropriate data to perform these sequences of tasks to extract clean speech. As an alternative to speech, another or the same implementation includes desired audio signal such as audio from a television or an alarm system within a defined acoustic field. The system subsequently modifies its dynamics to optimize a given set of metrics, such as intelligibility.

Another benefit of an open ear hearing system is that, because the direct (or open) path is providing low frequency content, it enables the indirect (e.g., augmented) path to maximize the available acoustic output of the audio reproduction system to amplify the higher frequency content that wearers with hearing loss typically need help. For example, the acoustic output of the system can be optimized to enable the delivery of high signal-to-noise ratios (ideally 10+dB of SNR) of higher frequency speech content in high noise environments (e.g., 70-80+dB). The system leverages the full capability of the audio reproduction system to amplify desired speech, which is higher in frequency. The system further compensates for typical age-related hearing loss (which is also higher in frequency) without sacrificing naturalness because the low frequency content is provided via the direct path.

The augmented path of an example includes a dynamic range compression/expansion block that increases the speech levels in three middle-to-high frequency octave bands centered at the 1 k, 2 k, and 4 k i.e. ~800 Hz to 5 kHz. The lower frequencies are compressed or filtered and rely on the direct path. Frequencies beyond 5 kHz sometimes are suppressed as they can worsen noise floor, distortion, comb filtering, and feedback.

These features directly assist with intelligibility. The system maintains naturalness while also optimizing the amplified path specifically for improving the net intelligibility. Put another way, naturalness is maintained while also optimizing the amplified path specifically for improving the net intelligibility. Implementations additionally use a higher percentage of the available output power towards specific spectral bands for better performance in loud environments.

Figure 5:
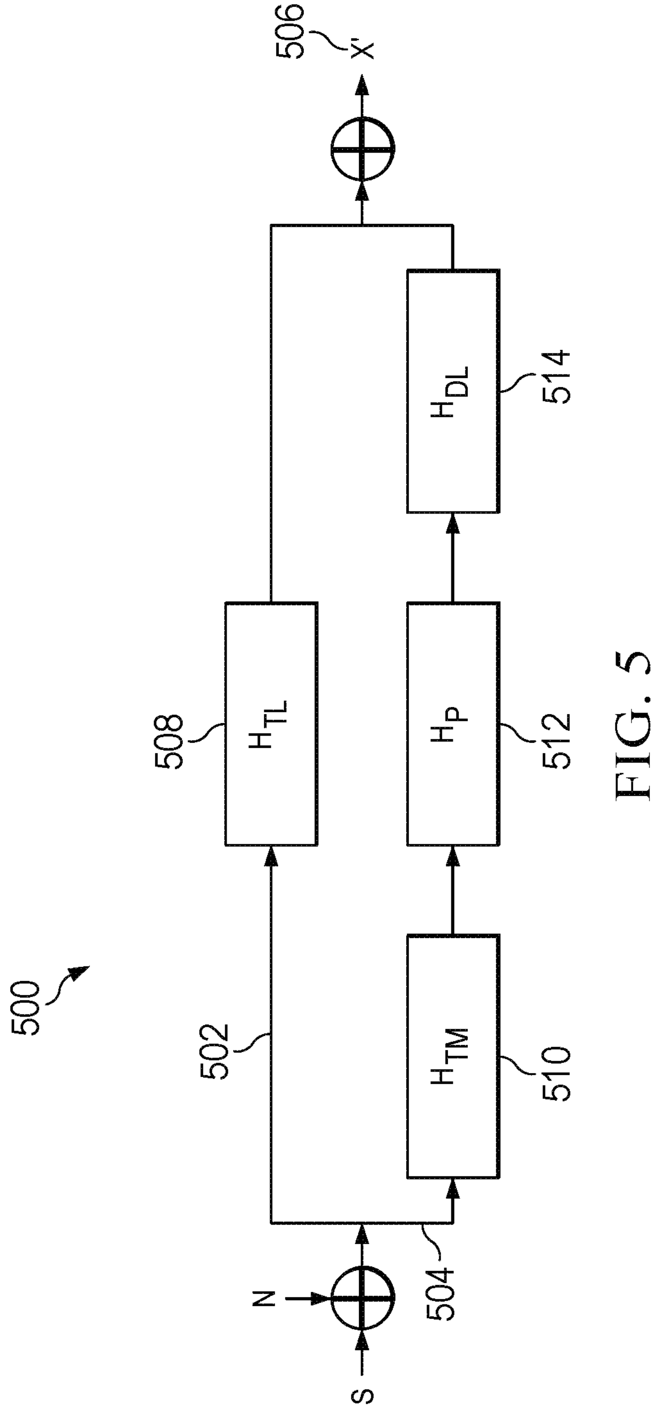
FIG. 5 is a block diagram illustrating direct and augmented path transfer functions.

FIG. 5 is a block diagram illustrating direct and augmented path transfer functions. The diagram is more particularly a schematic showing a system 500 with the two acoustic paths 502, 504 to the ear 506. A direct path 502 is influenced by the talker-to-the-listener ear transfer function ($H_{TL}$) 508, and the indirect (e.g., augmentation) path 504 is determined by the talker-to-microphone transfer function ($H_{TM}$) 510, the driver-to-listener ear transfer function ($H_{DL}$) 514, and the system signal processing transfer function ($H_P$) 512.

The blocks $H_{TL}$, $H_{TM}$, $H_{DL}$ include room acoustics and head diffraction effects. In the example below these transfer functions are set to unity. Expanded simulations can include these transfer functions in addition to spatial directional effects in Lombard speech and in a diffused field of interferences.

The following expression relates the real ear pressure to the total pressure generated from the direct path and the indirect path:

$$P_{in}H_{TL}G = P_{in}H_{TL} + P_{in}H_{TM}\cdot A\cdot H_{DL}$$

where $P_{in}$ is the sound pressure at the talker, His a transfer function; T is the talker mouth reference point (MRP); L is the listener ear reference point (ERP); and M is the microphone; D is the driver; and A is the amplification applied in the indirect path. Thus, $H_{TL}$ is the talker to listener ear transfer function. $H_{TM}$ is the talker to microphone transfer function, and $H_{DL}$ is the driver (i.e., speaker) to listener ear transfer function. As an example, for a desired real ear gain target G, A is adjusted to make the left and right side of the above expression equal after including the transfer functions $H_T$, $H_{TM}$, and $H_{DL}$. The system is configured to cause the processing transfer function $H_P$ 512 to generate the amplification A provided in the indirect path to match the real ear gain target G. The real ear gain targets are chosen to improve intelligibility and may be the gain targets prescribed by NAL NL-2 or DSL for people with hearing loss. The above equation can also be re-written as:

$$A_b = [G_b - 1]\left[\frac{H_{TL}}{H_{TM}\cdot H_{DL}}\right]$$

where the subscript b indicates frequency bands. This formulation enables altering A in different frequency bands to independently achieve a target in different frequency bands. It also enables amplification of the high frequency bands in A, specifically for achieving real ear gains G that are uniquely designed to only emphasize speech intelligibility through the indirect path while letting frequency bands in the direct path preserve naturalness and some audibility of the desired speech.

While the exact nature of $H_{TL}$ and $H_{TM}$ cannot be obtained in a real-life setting, their ratio as appearing in the above formula can be approximately predicted a-priori and used for processing in real-life. In that process, as a secondary benefit, it enables building into the gain optimization the frequency band specific impact of the transfer functions H, parts of which include the distance and angle of the talker with respect to the listener which typically contain significant high frequency variations.

While the sparse AI processing is effective at extracting a desired signal from noise, there are often noise components still present in the desired signal. As such, some implementations use speech signal expansion techniques to further improve intelligibility. More particularly, processes selectively expand the gain applied to certain frequency bands of an audio signal based on an AI determined probability that the band is a clean signal to maximize intelligibility. An example of a system effectively stretches to frequencies associated with a speech signal (e.g., octaves centered at 1 kHz, 2 kHz, and 4 kHz) at a certain amplitude range (e.g., 30-50 dB) while also compressing the noise portion within the selected band. These actions perceptibly raise the speech out of noise and improve the overall signal-to-noise ratio (SNR) experienced by the user without occluding the ear. To this end, the system determines to which frequency band(s) the expansion should be applied. An implementation additionally determines a signal level range to be expanded. When high noise is detected, the system may shift the frequency band to apply expansion up in frequency and/or may adjust amplitude range to apply expansion up in range applied because the frequency and level of the speech has changed (e.g., people speaking in high noise environments tend to speak louder and at a higher frequencies).

A model is trained on a large data set of output for a variety of noise and speech, and the model is applied to identify estimates of the frequency and level (or amplitude) ranges that are the most likely candidates for expansion. In one example, the model outputs a statistical estimate of the best candidates for expansion. Training of the model reduces instances where noise, rather than good speech data, is expanded.

After this denoising step, processes bin the audio signal into different frequency bands. Because the data is generated with Lombard effect speech data in noise, as the ambient noise levels change, the expansion frequency bands and the signal level ranges will change accordingly. Put another way, the Lombard effect is incorporated into the training data. In another or the same implementation, bins in which expansion is applied are shifted because the most beneficial speech content has shifted up in frequency due to the Lombard effect. Additionally, audio levels are modified because the speaker will be louder because of the background noise. In this manner, the parameters shift as needed to expand just the speech component.

The model determines which frequency band(s) has the highest probability of having clean speech data. The audio band that is split includes both a speech and a noise component. The system further determines where within the band to split it between speech and noise portions. Because noise can otherwise mask the speech levels, the speech component in each band is modified to functionally amplify the speech component beyond the noise portion. In some scenarios, the speech frequencies are expanded without doing anything to the noise range of the band. In other examples, the noise portion within the band (e.g., at the determined split) is compressed to further distinguish it from the expanded speech portion.

The signal is received at one or more microphones. The audio signal includes desired audio (e.g., speech), as well as ambient noise. The audio signal is processed by program code that includes a denoiser circuit that comprises AI. The AI of an example determines probabilities of the desired audio being in one or more certain audio bands (e.g., including frequency ranges audible to humans). The AI applies a model that is trained on audio data having different speech and noise characteristics, having been generated under different scenarios and in different environments including high noise environments when humans tend to speak louder (i.e., higher amplitude or SPL level) and shift the frequency of their voice upward (this is known as the Lombard effect). As such, the AI can recognize and extract desire speech from noise and apply a probability that the extracted signal is the desired signal for a particular frequency. For example, the AI denoiser may detect a human voice signal in the midst of a noisy signal received form the microphone and apply a probability that the extracted signal is the desired signal.

This probability may be applied to the entire extracted signal, or the AI system may apply separate probabilities to various frequency ranges (e.g., octave bands or ⅓ octave bands). Conversely, the AI determines which bands, and which frequencies within that band, are likely to include relatively large amounts of noise. As such, the AI denoiser indicates which bands of the signal are likely good candidates for expansion or compression.

The assigned probabilities are communicated to a signal expansion circuit, or expander, which comprises audio processing software. The block of frequencies within the band that have been determined to likely have clean speech data is expanded to make a bigger signal (i.e., a signal with higher amplitude or level). The expander increases, or expands, the dynamic range of an audio band of the audio signal according to the determined probabilities that were transmitted from the AI.

Expanding the audio band allows for a greater perceived difference between the desired speech and less wanted sounds. For instance, the desired speech or other sound can be perceived as being louder than noise in the band. To illustrate, a signal varying between 30 dB and 40 dB may be expanded to 30 dB and 50 dB. As explained herein, the portion of the band below 30 dB may be compressed. In one example, the system designates six octave bands between 125 Hz and 4 kHz (e.g., roughly the human speech band). Other implementations include 18 bands or some number in between.

An example of the method applies a set of frequency-dependent gains to compensate for hearing loss, depending on the input level of the desired signal. The gains include preset or a pre-programmed gains. The expanded, desired signal with hearing loss compensation and applied gains is rendered and the acoustic signal is delivered to the ear of a wearer. Some systems may also apply compression to signals when the gain applied by the expansion network and/or the gains applied to compensate for hearing loss exceed the capabilities of the audio reproduction system (e.g., would cause driver clipping, artifacts or other distortions).

Implementations dynamically adjust the parameters of the incoming audio signal. For instance, an implementation of the expansion network accounts for the Lombard effect by shifting up the frequency bins to which expansion is applied in high noise environments (e.g., >80 dB) and/or shifting the amplitude range to which expansion is applied as well as the level of expansion that is applied.

Implementations include frameworks for optimization of compression algorithms to improve or maximize intelligibility scores. In some examples, speech signal components are raised above coexisting noise levels to improve intelligibility. For instance, signal intensity levels of an audio signal are decreased while the frequency of a speech signal component of the audio signal is increased in a higher octave band. A neural network algorithm is trained to optimize changes in noise fields, self-voice speech levels and desired speech/audio levels.

To illustrate how an open-ear hearing system such as that described in FIGS. 1-4 above can significantly improve intelligibility, consider FIGS. 6-10.

Figure 6:
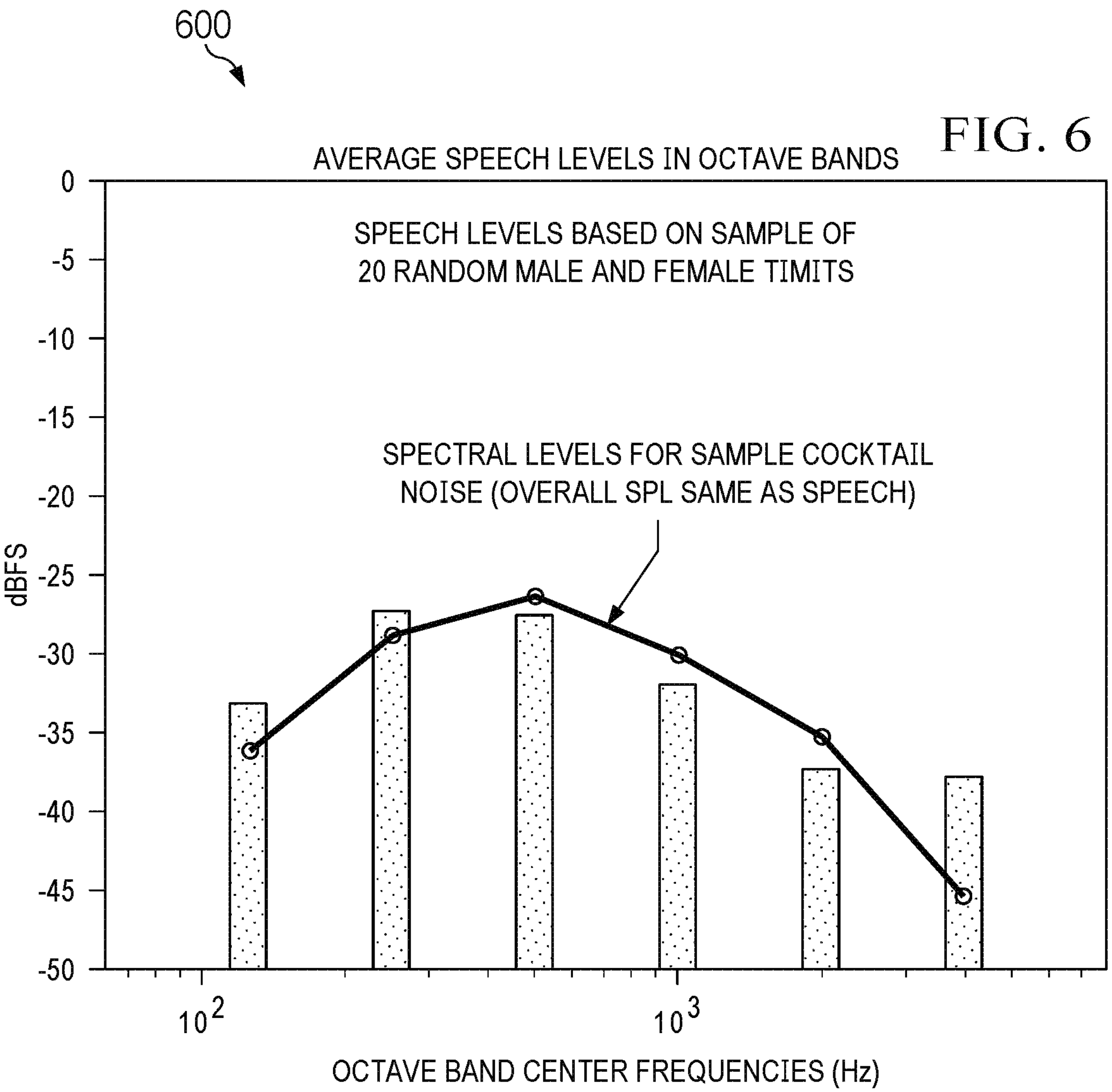
FIG. 6 is a plot of the average speech levels of selected TIMITS in six octave bands.

FIG. 6 is a plot 600 of the average speech levels (dBFS) of randomly selected TIMIT Acoustic-Phonetic Continuous Speech Corpus samples in the six octave bands and are represented by the black bars. Corresponding levels of the interfering cocktail noise are overlaid and is represented by the line plot. Both the speech and noise are set to have approximately the same rms levels (i.e. 0 dB SNR). Average speech levels in 6 octave bands for a nominal speech effort are generated from random male and female TIMITS. The plot shows the gradually decreasing signal levels with increasing frequency approximately similar to the International Telecommunications Union (ITU) specifications on nominal speech effort intensity levels.

Figure 7:
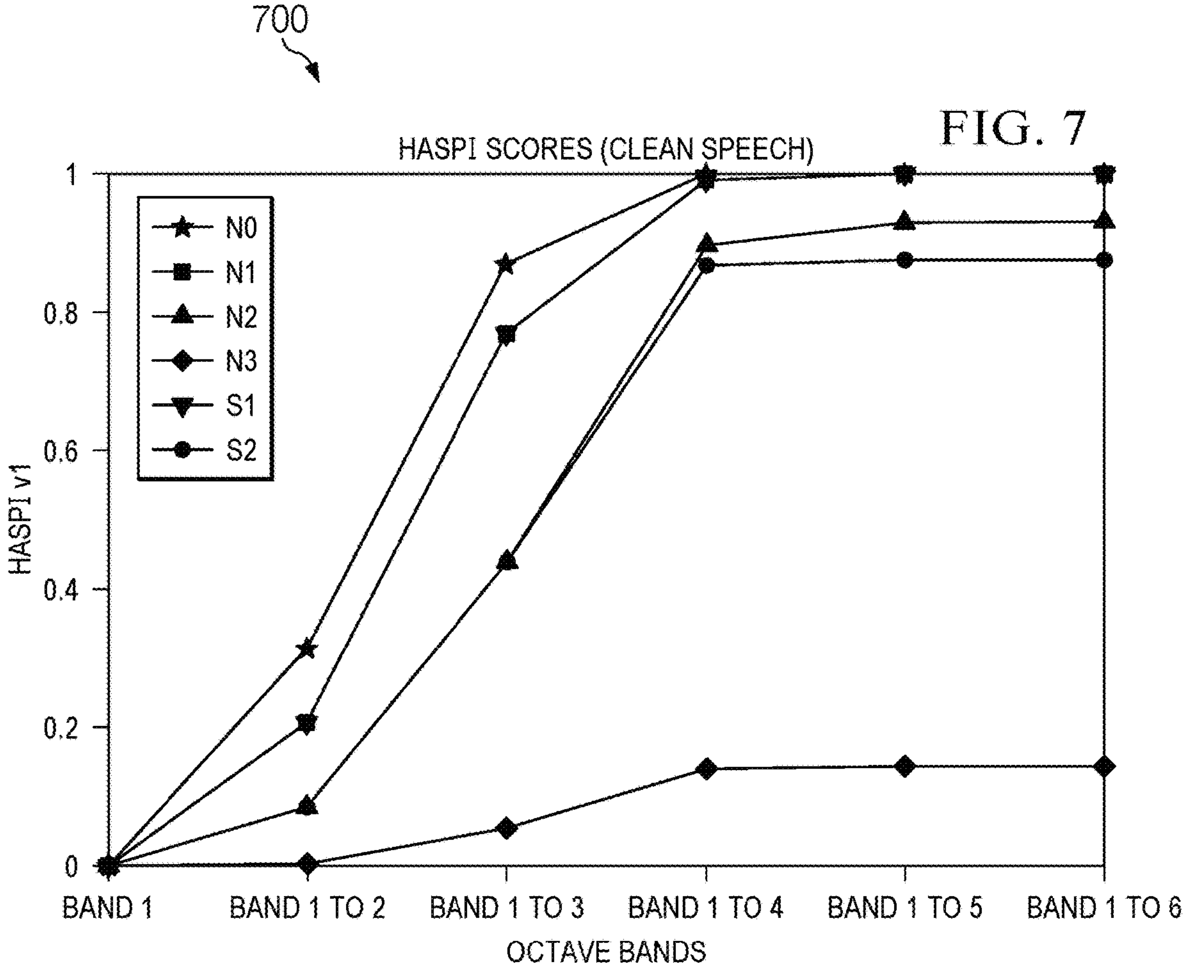
FIG. 7 is a graph scoring degradation of clean speech processed through the audiograms.

Referring to FIG. 7, the graph 700 shows how intelligibility (as measured by Hearing Aid Speech Perception Index (HASPI) score) increases as a person hears more of the octave bands. The various plots in the graph 700 show the impact of decreasing signal intensity and hearing sensitivity at higher octave as measured by HASPI score (or intelligibility) of clean speech processed through standard hearing loss profiles N0-N3 and S1-S2 described by Bisgaard, N., Vlaming, M. S., & Dahlquist, M. (2010), Standard Audiograms and Hearing Aid Fitting: A Study of the Effects of Different Fitting Strategies on Hearing Aid Users.

As the chart in FIG. 7 shows, providing more signal at the higher octaves can significantly improve intelligibility for all hearing loss profiles except N3, which experiences more modest intelligibility improvement.

Thus, an expansion of speech signal components in the higher octave bands (e.g., beyond 3 in this analysis) to effectively 'lift' it above the coexisting noise levels, hence, has the potential to significantly improve speech intelligibility for the vast majority of hearing loss profiles.

Figure 8:
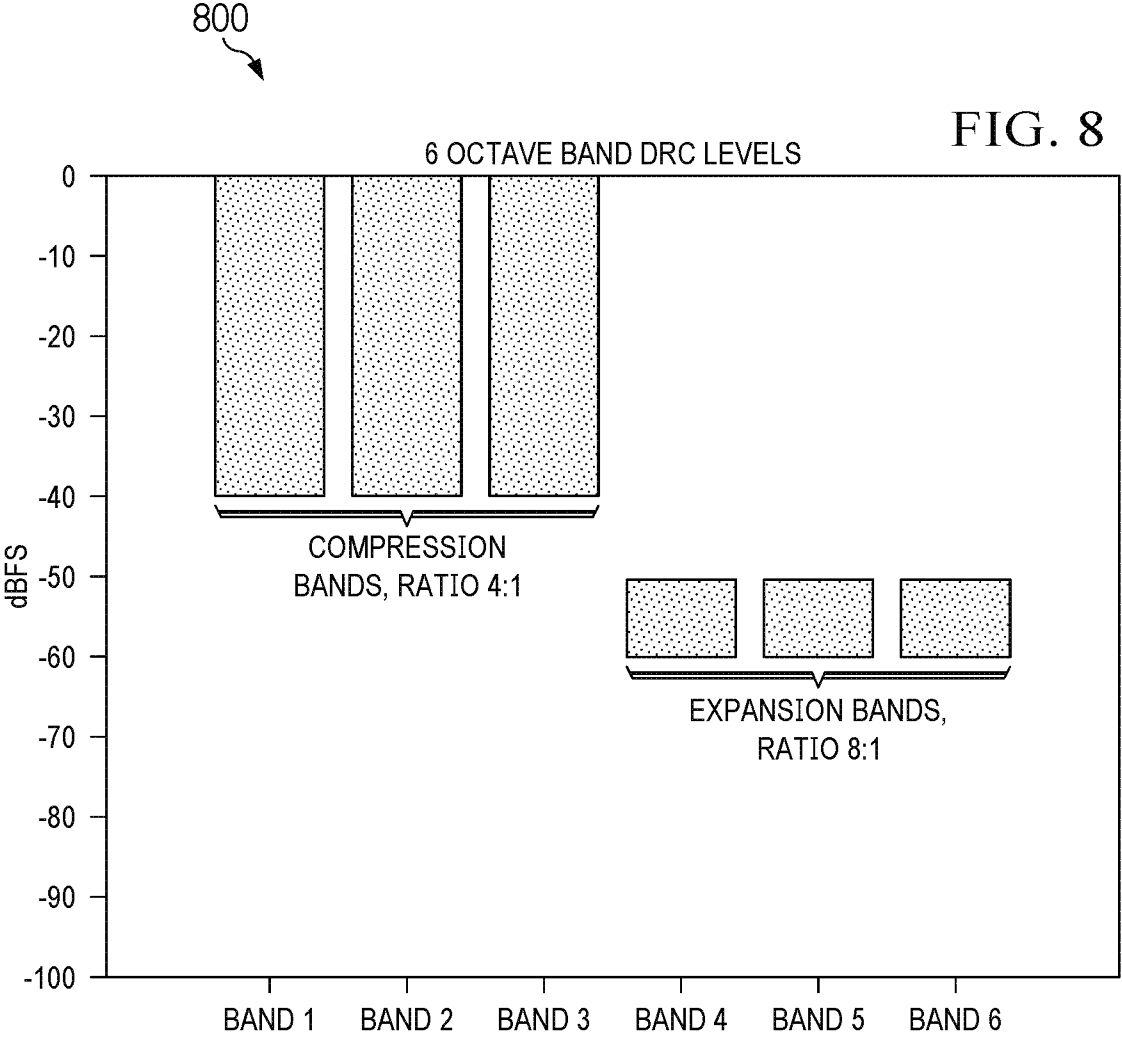
FIG. 8 is a chart depicting compression and expansion parameters.

FIG. 8 illustrates a dynamic range compression/expansion scheme applied to the signal received from the sparse AI processor across 6 octave bands (centered at 125 Hz, 250 Hz, 500 Hz, 1000 Hz, 2000 Hz, and 4000 Hz). As shown, the signal in the lower octave bands (i.e., bands 1-3 which are centered at 125 Hz, 250 Hz, and 500 Hz, respectively) are compressed at a 4:1 compression ratio if the incoming signal is between 0 and −40 dBFS (which is a relatively loud signal). Compressing signal at a 4:1 ratio, the system significantly reduces the amount of the input signal (from the AI denoiser) that is passed through when it falls within these compression bands. Conversely, the signal in the upper three octave bands (i.e., bands 4-6 which are centered at 1000 Hz, 2000 Hz, and 4000 Hz, respectively) is expanded at an 8:1 ratio if the incoming signal is between −50 and −60 dBFS (which is where one would expect speech to be). In this example, the system significantly expands the input signal when it falls into these expansion bands at a ratio of 8:1.

In one example, the system input signal from the microphone array is first processed by an AI denoiser block to isolate speech content from noise, and then processed by a dynamic range compression/expansion block that applies the frequency-dependent gains according to the user's hearing loss profile followed by an compression of loud content in the lower bands (e.g., such as the compression windows shown in FIG. 8 in bands 1-3) and an expansion of the signal where speech is most likely present in the mid and upper bands (e.g., such as the expansion windows shown in FIG. 8 in bands 4-6). The compression and expansion bands may be dynamically changed based on the probabilities assigned by the AI denoiser block that the signal in a band is speech or based on the ambient room environment (e.g., to account for the Lombard effect in loud environments).

FIG. 8 shows only one example of a dynamic compression/expansion scheme that operates to use a combination of compression of loud sounds at lower frequencies, while expanding a region where speech is likely to be present in the middle and upper frequencies. In some instances, the compression scheme changes in loud environments to account for the Lombard effect, which is the effect were a speaker tends to raise their voice in terms of both frequency and amplitude in a loud environment. So, for example, the system could modify its compression and expansion parameters to account for the louder environment, and shift the expansion windows to where speech would be in a loud environment with the Lombard effect.

Figure 9:
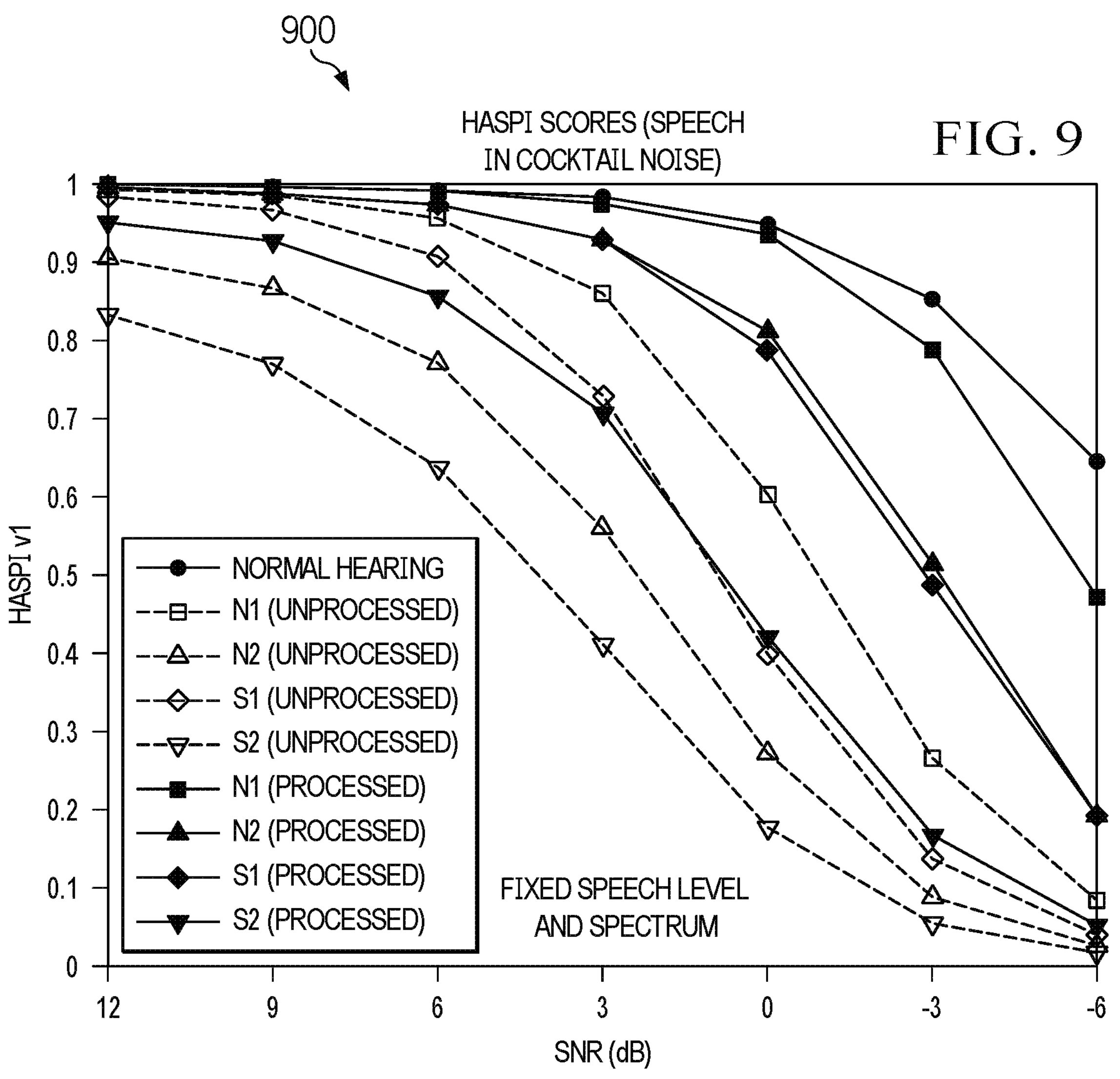
FIG. 9 is a graph that plots HASPI scores of the unprocessed signal (s(t)+n(t)) and the processed signal (x'(t)) for various SNR levels.

FIG. 9 is a graph 900 that plots the HASPI scores of the unprocessed signal (s(t)+n(t)) and the processed signal (x'(t)) for various SNR levels of different hearing loss profiles using the expansion and compression scheme shown in FIG. 8, along with an assumed 6 dB of denoising from the sparse AI processing. As shown, the compression/expansion scheme coupled with the AI denoising significantly improves intelligibility for all hearing loss profiles at all SNR levels, and is particularly effective at improving in high noise (i.e., low SNR) environments.

Figure 10:
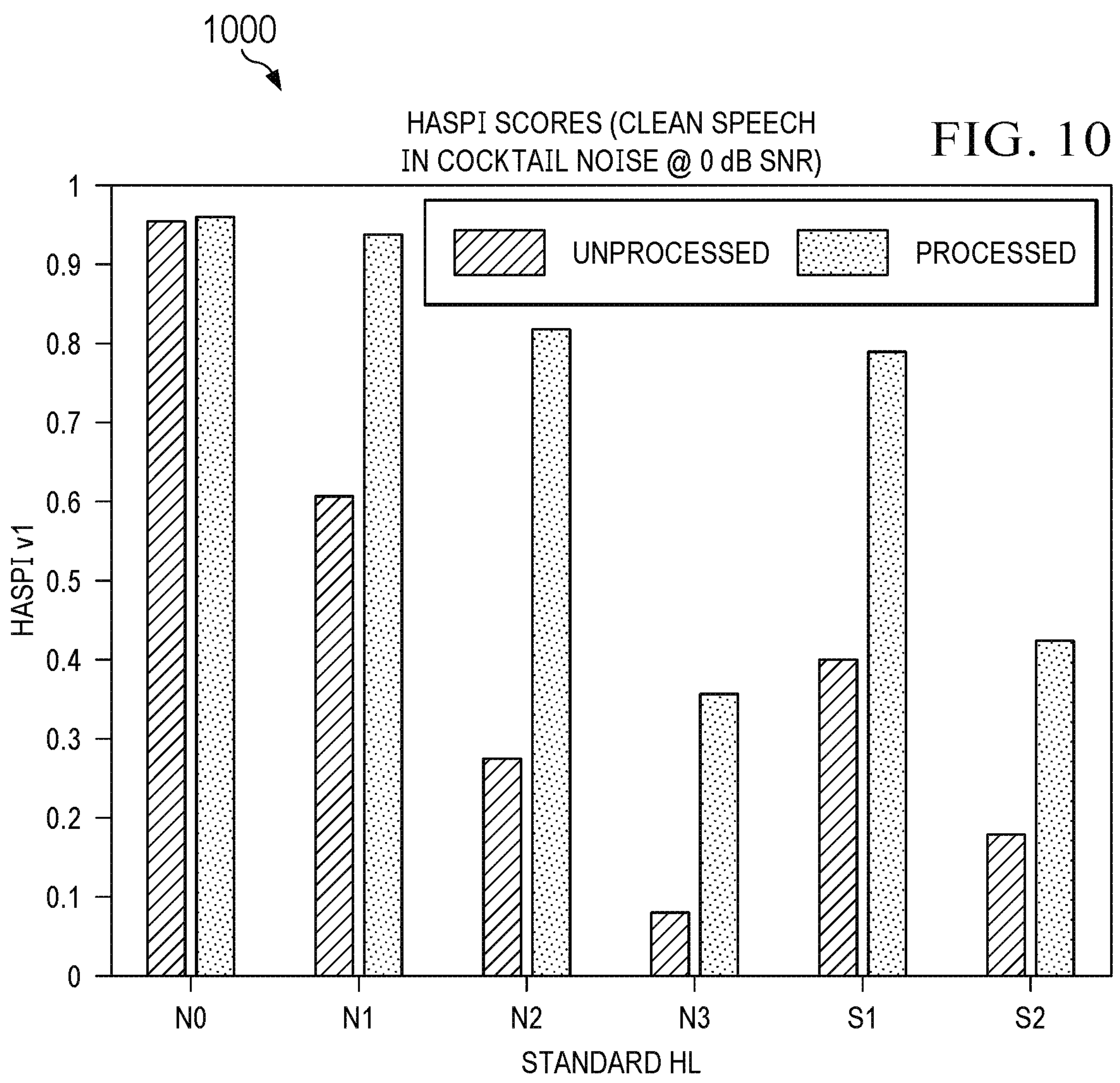
FIG. 10 is a graph depicting a change in HASPI scores.

FIG. 10 is a graph 1000 depicting the change in HASPI scores specifically at 0 dB SNR of different hearing loss profiles using the expansion and compression scheme shown in FIG. 8, along with an assumed 6 dB of denoising from the sparse AI processing. The net processed signal consisting of the expansion in upper bands and denoising have substantial increases in the HASPI scores across all hearing loss profiles and thus provides a framework to optimize the multiband DRC parameters.

A parameter for expansion is the application of appropriate signal level range. The optimal expansion range for each band is a function of the noise level within the band, as well as the speech level which in turn is dependent on the ambient noise level (e.g., Lombard speech). A trained neural network can infer the optimal range levels dynamically to changes in the noise field and speech level. Associated methods include a training model.

Such training model (e.g., a sparse AI machine learning model) can generally be trained to perform a given task, such as detecting speech in noise. Support vector machines, decision trees, random forests, and neural networks are just a few examples of suitable machine learning frameworks that have been used in a wide variety of other applications.

A support vector machine is a model that can be employed for classification or regression purposes. A support vector machine maps data items to a feature space, where hyperplanes are employed to separate the data into different regions. Each region can correspond to a different classification. Support vector machines can be trained using supervised learning to distinguish between data items having labels representing different classifications.

A decision tree is a tree-based model that represents decision rules using nodes connected by edges. Decision trees can be employed for classification or regression and can be trained using supervised learning techniques. Multiple decision trees can be employed in a random forest, which significantly improves the accuracy of the resulting model relative to a single decision tree. In a random forest, the individual outputs of the decision trees are collectively employed to determine a final output of the random forest. For instance, in regression problems, the output of each individual decision tree can be averaged to obtain a final result. For classification problems, a majority vote technique can be employed, where the classification selected by the random forest is the classification selected by the most decision trees.

A neural network is another type of machine learning model that can be employed for classification or regression tasks. In a neural network, nodes are connected to one another via one or more edges. A neural network can include an input layer, an output layer, and one or more intermediate layers. Individual nodes can process their respective inputs according to a predefined function, and provide an output to a subsequent layer, or, in some cases, a previous layer. The inputs to a given node can be multiplied by a corresponding weight value for an edge between the input and the node. In addition, nodes can have individual bias values that are also used to produce outputs.

Various training procedures can be applied to learn the edge weights and/or bias values of a neural network. The term "internal parameters" is used herein to refer to learnable values such as edge weights and bias values that can be learned by training a machine learning model, such as a neural network. The term "hyperparameters" is used herein to refer to characteristics of model training, such as learning rate, batch size, number of training epochs, number of hidden layers, activation functions, etc.

A neural network structure can have different layers that perform different specific functions. For example, one or more layers of nodes can collectively perform a specific operation, such as pooling, encoding, decoding, alignment, prediction, or convolution operations. For the purposes of this document, the term "layer" refers to a group of nodes that share inputs and outputs, e.g., to or from external sources or other layers in the network. The term "operation" refers to a function that can be performed by one or more layers of nodes. The term "model structure" refers to an overall architecture of a layered model, including the number of layers, the connectivity of the layers, and the type of operations performed by individual layers. The term "neural network structure" refers to the model structure of a neural network. The term "trained model" and/or "tuned model" refers to a model structure together with internal parameters for the model structure that have been trained or tuned, e.g., individualized tuning to one or more particular users. Note that two trained models can share the same model structure and yet have different values for the internal parameters, e.g., if the two models are trained on different training data or if there are underlying stochastic processes in the training process.

The term "model," as used herein, refers to a machine learning model employed to generate new content. One type of model is a "sparse AI model," which. For instance, a model that can be implemented as a neural network, which has been optimized for hearing performance (e.g., intelligibility as measured by HASPI or HASQI scores) within a power budget of 5 mW or less.

The term "machine learning model" refers to any of a broad range of models that can learn to generate automated user input and/or application output by observing properties of past interactions between users and applications. For instance, a machine learning model could be a neural network, a support vector machine, a decision tree, a clustering algorithm, etc. In some cases, a machine learning model can be trained using labeled training data, a reward function, or other mechanisms, and in other cases, a machine learning model can learn by analyzing data without explicit labels or rewards.

Figure 11:
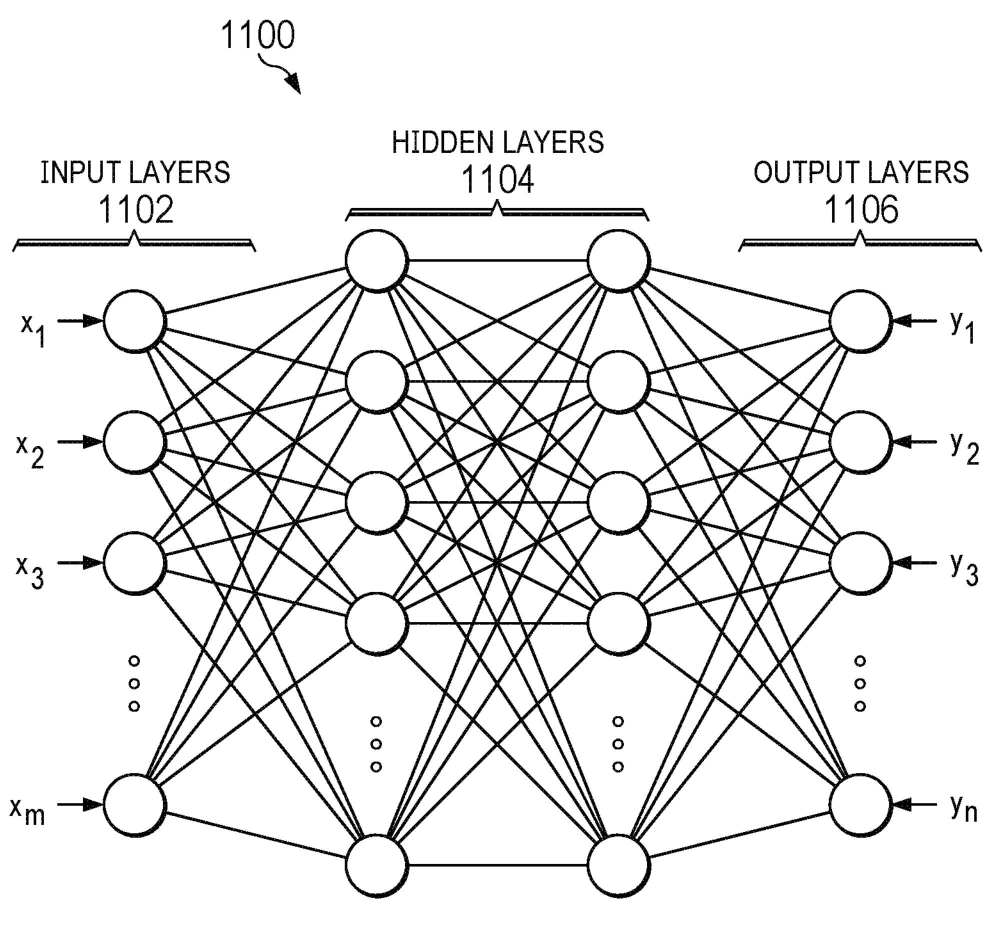
FIG. 11 illustrates an example machine learning model consistent with some implementations of the present concepts.

FIG. 11 shows a deep neural network 1100 with input layers 1102, hidden layers 1104, and output layers 1106.

Another or the same implementation includes sparse AI. The input layers can receive features $x_1$ through $x_m$. The input layers can feed into the hidden layers 1104. The hidden layers feed into the output layers 1106. The output layers can output values $y_1$ through $y_n$. In some cases, the output values are calculated using a regression approach, and in other cases using a classification approach.

In a regression approach, AI is used to estimate a relationship between independent variables and dependent variables, which may include actions of a helper. The dependent variable, or response variable, is used to predict or otherwise identify restricted actions. Through data collection and machine learning, the AI of an example establishes that a helper attempts to access a menu is a predictor that the helper is trying to access prohibited data. As such, the menu accessing attempt is classified as a restricted action. In an example of an unrestricted action, the AI of another example determines a relationship between a helper slowing down a locomotive at bend of a virtual train track and likelihood of successfully staying on the track. In this scenario, the adjustment of the speed of the locomotive comprises an unrestricted action.

Neural network 1100 is shown with a general architecture that can be modified depending on the task being performed by the neural network. For instance, neural networks can be implemented with convolutional layers to implement a computer model. Neural networks can also have recurrent layers such as long short-term memory networks, gated recurrent units, etc.

Figure 12:
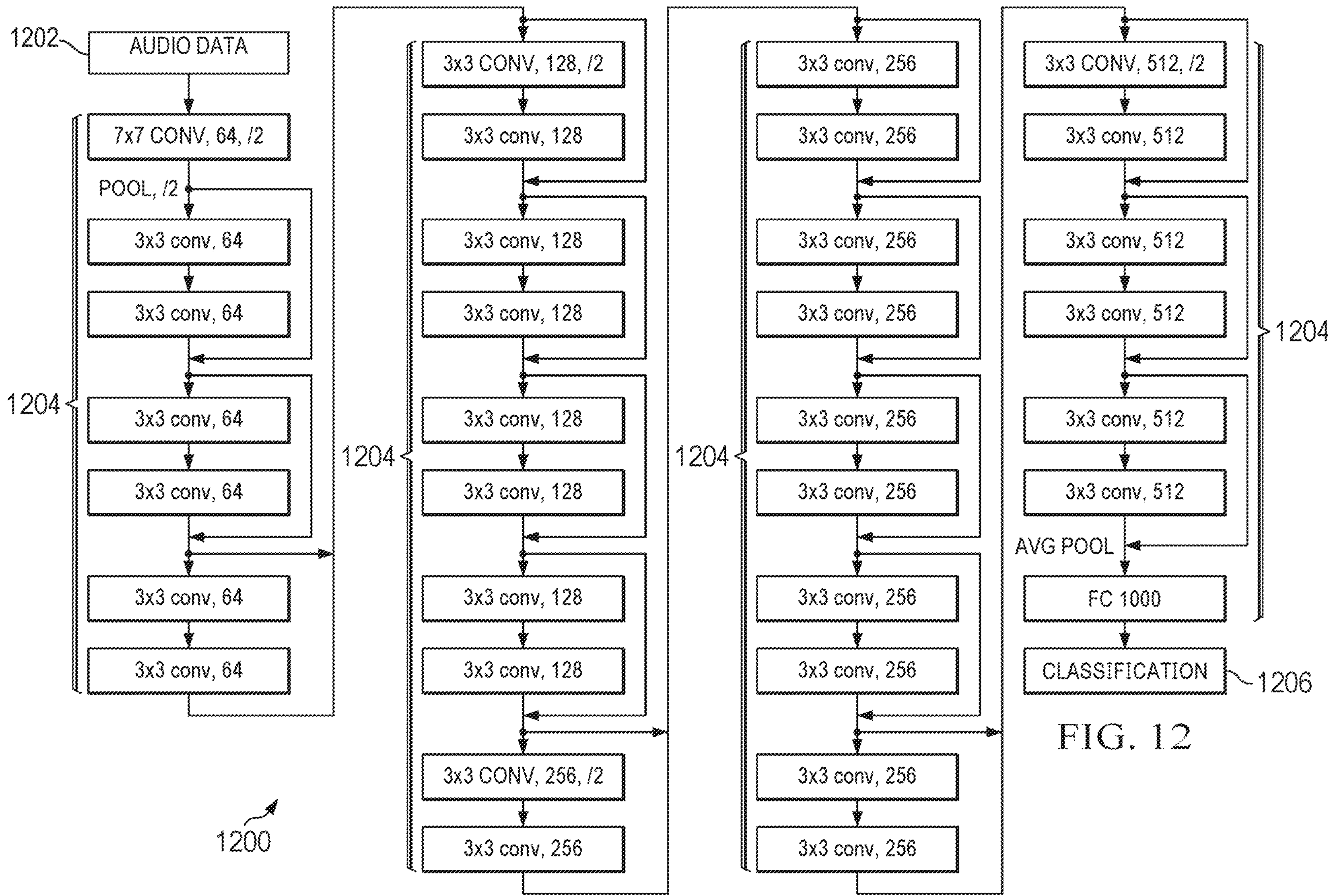
FIG. 12 illustrates an example computer model consistent with some implementations of the present concepts.

While FIG. 11 illustrates a general architecture of a neural network, FIG. 12 illustrates a particular example of a neural network model. For instance, FIG. 12 shows an audio data 1202 being classified by a model 1204 to determine a classification 1206. For instance, the audio data can include part or all of a stream of digital data. The computer model can include a number of convolutional layers, most of which have 3×3 filters. Generally, given the same output feature map size, the convolutional layers have the same number of filters. If the feature map size is halved by a given convolutional layer (as shown by "/2" in FIG. 12), then the number of filters can be doubled to preserve the time complexity across layers.

After the audio data has been processed using a series of convolutional layers, the audio data is processed in a global average pooling layer. The output of the pooling layer is processed with a 1000-way fully connected layer with softmax. The fully connected layer can be used to determine a classification, e.g., an object category of an object in audio data 1202.

The respective layers within computer model 1204 can have shortcut connections which perform identity operations: $y=F(x, \{W_i\})+x$, where x and y are the input and output vectors of the layers involved and $F(x, \{W_i\})$ represents the residual mapping to be learned. In some connections the dimensions increase across layers. In these cases, the following projection can be employed to match the dimensions via 1×1 convolutions: $y=F(x, \{W_i\})+W_s x$.

In some implementations, computer model 1204 can be pretrained on a large dataset of audio data. Such a general-purpose audio data database can provide a vast number of training examples that allow the model to learn weights that allow generalization across a range of object categories. Said another way, computer model 1204 can be pretrained in this fashion. After pretraining, computer model 1204 can be tuned on another, smaller dataset for other treatment data and categories of interest.

As noted above, not all device implementations can be illustrated, and other device implementations should be apparent to the skilled artisan from the description above and below. The term "device" or "module," as used herein can mean any type of device that has some amount of hardware processing capability and/or hardware storage/memory capability. Processing capability can be provided by one or more hardware processors (e.g., hardware processing units/cores) that can execute data in the form of computer-readable instructions. When executed the computer-readable instructions can cause the hardware processors to provide functionality. Computer-readable instructions and/or data can be stored on storage, such as storage/memory and or the datastore. The term "system" as used herein can refer to a single device, multiple devices, etc.

Storage resources can be internal or external to the respective devices with which they are associated. The storage resources can include any one or more of volatile or non-volatile memory, hard drives, flash storage devices, and/or optical storage devices (e.g., CDs, DVDs, etc.), among others. As used herein, the term "computer-readable medium" can include signals. In contrast, the term "computer-readable storage medium" excludes signals. Computer-readable storage media includes "computer-readable storage devices." Examples of computer-readable storage devices include volatile storage media, such as RAM, and non-volatile storage media, such as hard drives, optical discs, and flash memory, among others.

In some cases, the devices are configured with a general-purpose hardware processor and storage resources. In other cases, a device can include a system on a chip (SOC) type design. In SOC design implementations, functionality provided by the device can be integrated on a single SOC or multiple coupled SOCs. One or more associated processors can be configured to coordinate with shared resources, such as memory, storage, etc., and/or one or more dedicated resources, such as hardware blocks configured to perform certain specific functionality. Thus, the term "processor," "hardware processor" or "hardware processing unit" as used herein can also refer to central processing units (CPUs), graphical processing units (GPUs), controllers, microcontrollers, processor cores, or other types of processing devices suitable for implementation both in conventional computing architectures as well as SOC designs.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In some configurations, any of the modules/code/blocks discussed herein can be implemented in software, hardware, and/or firmware. In any case, the modules/code/blocks can be provided during manufacture of the device or by an intermediary that prepares the device for sale to the end user. In other instances, the end user may install these modules/code/blocks later, such as by downloading executable code and installing the executable code on the corresponding device.

Also note that the devices described herein can function in a stand-alone or cooperative manner to implement the described techniques. For example, the methods and functionality described herein can be performed on a single computing device and/or distributed across multiple computing devices that communicate over network(s). Without limitation, network(s) can include one or more local area networks (LANs), wide area networks (WANs), the Internet, and the like.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

The invention claimed is:

1. An apparatus, comprising:

a left eyewear stem and right eyewear stem, each comprising:

a microphone array comprising a plurality of microphones;

a processor that receives content from the microphone array, wherein the processor processes the content through an inference model in a neural network trained to recognize speech in noise to produce a desired signal from the content, wherein the processor applies frequency-dependent gain to the desired signal to compensate for a user's hearing loss profile; and a speaker that receives the desired signal modified with the frequency-dependent gains to acoustically render the desired modified signal proximate to an ear of the user without anything physical being placed within an entrance to an ear canal;

a battery;

a front face capable of holding a pair of eyewear lenses, wherein the front face lacks an electrical conductor connecting the left eyewear stem and right eyewear stem, wherein the processor in the left eyewear stem independently processes content from the microphone array in the left eyewear stem, and the processor in the right eyewear stem independently processes content from the microphone array in the right eyewear stem; and a wireless link between the left eyewear stem and right eyewear stem that provides synchronization for at least one of:

system volume;

left/right balance; or playback of audio received from a connected audio source other than the microphone arrays.

2. The apparatus of claim 1, wherein the processor is further configured to apply a frequency filter and transfer function to predict noise in a specified frequency range that will arrive at the user's ear canal.

3. The apparatus of claim 1, wherein the processor is further configured to reduce or clamp gain on audio output by the speaker in response to detection of oscillations present in the desired signal going to the speaker that are not originally present in the desired signal leaving the processor.

4. The apparatus of claim 3, wherein the processor reduces application of the frequency-dependent gain.

5. The apparatus of claim 1, wherein the processor is further configured, responsive to detection of instability, to reduce or mute a signal level of the received content prior to processing.

6. The apparatus of claim 1, wherein the processor is trained to actively remove noise from ambient audio in the received content.

7. The apparatus of claim 6, wherein the processor predicts noise in a specific frequency range and generates an anti-noise signal to cancel the noise in the specific frequency range at the ear of the user.

8. The apparatus of claim 7, wherein the processor applies a frequency filter and transfer function to the microphone array.

9. The apparatus of claim 1, wherein the neural network is further trained to classify an environment according to ambient noise, reverberation, and steady state noises and adjusts compression/expansion to maintain a constant signal-to-noise ratio.

10. The apparatus of claim 1, wherein the processor comprises a sparse AI processor.

11. The apparatus of claim 1, wherein the wireless link between the left eyewear stem and right eyewear stem that further provides synchronization for beamforming patterns.

12. The apparatus of claim 1, wherein the processor applies the frequency-dependent gain to the desired signal according to one of the following:

normal hearing;

one of a number of user-selected preset settings that address different hearing loss profiles;

a number of parameters programmed into the processor by a hearing care professional; or a number of parameters matched to the user's hearing loss profile by self-fitting software.

13. An apparatus, comprising:

a front face capable of holding a pair of eyewear lenses;

a left eyewear stem and a right eyewear stem coupled to the front face, wherein each eyewear stem comprises:

a microphone array;

a neural network trained to extract a desired signal from ambient audio received from the microphone array by optimizing changes in noise fields, self-voice speech levels, and desired speech/audio levels, wherein the neural network processes ambient audio exclusively from the microphone array in its respective eyewear stem independently of the other neural network;

a compression/expansion module that applies frequency-dependent gain adjustments to compensate for a user's hearing loss; and circuitry that receives the desired signal from the neural network with the frequency-dependent gains to acoustically render the desired signal proximate to an ear of a user without anything physical being placed within an entrance to an ear canal.

14. The apparatus of claim 13, further comprising a wireless link between the left eyewear stem and right eyewear stem that provides synchronization for at least one of:

system volume;

left/right balance;

beamforming patterns; or playback of audio received from a connected audio source other than the microphone arrays.

15. The apparatus of claim 13, wherein the microphone arrays in each of the left eyewear stem and right eyewear stem are configured to form a first beamforming pattern comprising:

a narrow beamforming pattern that is at an angle that is less than or equal to 180 degrees normal to the front face; and an omnidirectional beamforming pattern that is 360 degrees normal to the front face.

16. The apparatus of claim 13, wherein the neural network comprises a sparse AI model.

17. The apparatus of claim 16, wherein the processor system is configured to process the content from the microphone array through the sparse AI model at a power consumption of less than or equal to 5 mW.

18. The apparatus of claim 16, wherein digital signal processing is integrated within the sparse AI model.

19. The apparatus of claim 13, wherein the compression/expansion module applies the frequency-dependent gain to the desired signal according to one of the following:

normal hearing;

one of a number of user-selected preset settings that address different hearing loss profiles;

a number of parameters programmed into the processor by a hearing care professional; or a number of parameters matched to the user's hearing loss profile by self-fitting software.

20. The apparatus of claim 13, wherein the compression/expansion module determines in which frequency range speech is present based on probabilities assigned by the inference model.

21. An apparatus comprising:

a left eyewear stem, comprising:

a first microphone array;

a first processor system that receives first auditory content from the first microphone array and processes the first auditory content through a first neural network trained to extract a first desired signal from the first auditory content, and wherein the first processor system applies frequency-dependent gains to the first desired signal to compensate for a user's hearing loss profile;

a first battery; and first circuitry that receives the first desired signal modified with the frequency-dependent gains to acoustically render the first desired modified signal proximate to the left ear of the user without anything physical being placed within the entrance to left ear canal;

a right eyewear stem, comprising:

a second microphone array;

a second processor system that receives second auditory content from the second microphone array and processes the second auditory content through a second neural network trained to extract a second desired signal from the second auditory content, wherein the first neural network and second neural network operate independently of each other, and wherein the second processor system applies frequency-dependent gains to the second desired signal to compensate for a user's hearing loss profile;

a second battery; and second circuitry that receives the second desired signal modified with the frequency-dependent gains to acoustically render the second desired modified signal proximate to the right ear of the user without anything physical being placed within the entrance to right ear canal;

a front face capable of holding a pair of eyewear lenses and coupled to the left eyewear stem and right eyewear stem, wherein the front face lacks an electrical conductor connecting the right eyewear stem and left eyewear stem, wherein the first processor in the left eyewear stem independently processes content from the first microphone array in the left eyewear stem, and the second processor in the right eyewear stem independently processes content from the second microphone array in the right eyewear stem; and a wireless link between the left eyewear stem and right eyewear stem that provides synchronization for at least one of:

system volume;

left/right balance; or playback of audio received from a connected audio source other than the microphone arrays.

22. The apparatus of claim 21, wherein the wireless link between the left eyewear stem and right eyewear stem that further provides synchronization for beamforming patterns.

* * * * *